United States Patent [19]
Van Lente et al.

[11] Patent Number: 5,614,885
[45] Date of Patent: Mar. 25, 1997

[54] ELECTRICAL CONTROL SYSTEM FOR VEHICLE OPTIONS

[75] Inventors: Paul S. Van Lente; Mark L. Zeinstra; Michael J. Suman; William S. DeVree, all of Holland, Mich.

[73] Assignee: Prince Corporation, Holland, Mich.

[21] Appl. No.: 567,390

[22] Filed: Aug. 14, 1990

Related U.S. Application Data

[63] Continuation-in-part of Ser. No. 279,643, Dec. 5, 1988, abandoned.

[51] Int. Cl.⁶ .......................... G08B 25/00; G05B 19/02
[52] U.S. Cl. ................ 340/525; 340/425.5; 340/825.69; 340/825.72; 340/825.22
[58] Field of Search ................................ 340/525, 459, 340/461, 462, 539, 531, 715, 825, 69, 825.72, 825.22; 364/424.01, 424.03, 424.05, 550; 318/16, 17, 286, 266, 264, 466, 467, 468; 307/9.1, 10.1; 33/356, 361, 348; 362/83.1

[56] References Cited

U.S. PATENT DOCUMENTS

| | | |
|---|---|---|
| Re. 29,525 | 1/1978 | Willmott . |
| Re. 32,576 | 1/1988 | Pastore . |
| 1,522,241 | 1/1925 | Hennessey . |
| 3,196,440 | 7/1965 | Weinstein . |
| 3,300,867 | 1/1967 | Sampson .................................... 33/222 |
| 3,337,992 | 8/1967 | Tolson .......................................... 49/29 |
| 3,399,554 | 9/1968 | Hogue . |
| 3,680,951 | 8/1972 | Jordan et al. . |
| 3,703,714 | 11/1972 | Andrews . |
| 3,723,967 | 3/1973 | Atkins et al. . |
| 3,866,168 | 2/1975 | McGuirk, Jr. . |
| 3,891,980 | 6/1975 | Lewis et al. . |
| 3,969,709 | 7/1976 | Isaacs et al. . |
| 4,100,372 | 7/1978 | Hypolite . |
| 4,103,430 | 8/1978 | Schrader .................................. 33/348 |
| 4,143,368 | 3/1979 | Route et al. . |
| 4,205,325 | 5/1980 | Haygood et al. . |
| 4,241,870 | 12/1980 | Marcus .................................. 296/37.7 |
| 4,247,850 | 1/1981 | Marcus ..................................... 340/694 |
| 4,309,828 | 1/1982 | Sakamoto .................................. 33/355 |
| 4,341,023 | 7/1982 | Marcus et al. ......................... 33/363 K |
| 4,385,296 | 5/1983 | Tsubaki et al. ..................... 340/825.72 |
| 4,424,631 | 1/1984 | Franks ....................................... 33/361 |
| 4,425,717 | 1/1984 | Marcus ..................................... 33/361 |
| 4,443,057 | 4/1984 | Bauer et al. . |
| 4,447,808 | 5/1984 | Marcus ..................................... 340/696 |
| 4,463,340 | 7/1984 | Adkins et al. . |
| 4,482,947 | 11/1984 | Zato et al. . |
| 4,488,777 | 12/1984 | Bauer et al. . |
| 4,499,451 | 2/1985 | Suzuki et al. . |
| 4,505,054 | 3/1985 | Clark et al. ............................... 33/357 |
| 4,529,980 | 7/1985 | Liotine et al. . |
| 4,535,333 | 8/1985 | Twardowski . |
| 4,546,551 | 10/1985 | Franks ....................................... 33/356 |
| 4,566,034 | 1/1986 | Harger et al. . |
| 4,573,046 | 2/1986 | Pinnow . |
| 4,580,875 | 4/1986 | Bechtel et al. . |
| 4,581,827 | 4/1986 | Higashi ...................................... 33/333 |
| 4,588,267 | 5/1986 | Pastore . |
| 4,602,256 | 7/1986 | Kago et al. . |
| 4,623,887 | 11/1986 | Welles, II . |

(List continued on next page.)

FOREIGN PATENT DOCUMENTS

| | | |
|---|---|---|
| 219440 | 9/1988 | Japan . |
| 20514442 | 3/1980 | United Kingdom . |

*Primary Examiner*—Donnie L. Crosland
*Attorney, Agent, or Firm*—Price, Heneveld, Cooper, DeWitt & Litton

[57] ABSTRACT

A vehicle structural accessory includes one or more electronic accessories. One electrical accessory which may be provided is an electronically trainable transmitter which is trainable to generate a control signal which will actuate a garage door opening mechanism. Another electronic accessory which may be included is an electronic compass. Yet another device is an electronically adjustable mirror having parameters set for each driver of a vehicle. The electronically adjustable rearview mirror and the electronically trainable garage door opener may be advantageously provided with a keyless entry system.

3 Claims, 27 Drawing Sheets

U.S. PATENT DOCUMENTS

| | | | |
|---|---|---|---|
| 4,626,848 | 12/1986 | Ehler . | |
| 4,630,904 | 12/1986 | Pastore . | |
| 4,631,708 | 12/1986 | Wood et al. | 340/825.54 |
| 4,635,033 | 1/1987 | Inukai et al. | 340/461 |
| 4,652,860 | 3/1987 | Weishaupt et al. . | |
| 4,665,397 | 5/1987 | Pinnow . | |
| 4,670,746 | 6/1987 | Taniguchi et al. . | |
| 4,672,375 | 6/1987 | Mochida et al. | 340/825.31 |
| 4,677,381 | 6/1987 | Geerlings | 324/253 |
| 4,678,281 | 7/1987 | Bauer . | |
| 4,688,036 | 8/1987 | Hiraneo et al. . | |
| 4,694,583 | 9/1987 | Blaney | 33/361 |
| 4,701,022 | 10/1987 | Jacob . | |
| 4,703,359 | 10/1987 | Rumbolt et al. . | |
| 4,707,788 | 11/1987 | Tashiro et al. | 318/466 |
| 4,709,412 | 11/1987 | Seymour et al. . | |
| 4,712,105 | 12/1987 | Kohler . | |
| 4,719,460 | 1/1988 | Takeuchi et al. . | |
| 4,723,121 | 2/1988 | van den Boom et al. . | |
| 4,737,784 | 4/1988 | Hirano . | |
| 4,750,118 | 6/1988 | Heitshel et al. . | |
| 4,754,255 | 6/1988 | Sanders et al. . | |
| 4,760,394 | 7/1988 | Takeuchi et al. | 340/825.54 |
| 4,761,645 | 8/1988 | Mochida . | |
| 4,771,283 | 9/1988 | Imoto | 340/825.71 |
| 4,793,690 | 12/1988 | Gahan et al. . | |
| 4,794,268 | 12/1988 | Nakano et al. . | |
| 4,818,010 | 4/1989 | Dillon . | |
| 4,820,933 | 4/1989 | Hong et al. | 307/10.1 |
| 4,825,200 | 4/1989 | Evans et al. | 340/825.72 |
| 4,825,210 | 4/1989 | Bachhuber et al. | 340/825.31 |
| 4,835,533 | 5/1989 | Akutsu . | |
| 4,844,533 | 7/1989 | Dowd et al. . | |
| 4,856,072 | 8/1989 | Schneider et al. . | |
| 4,868,559 | 9/1989 | Pinnow . | |
| 4,869,670 | 9/1989 | Ueda et al. . | |
| 4,881,148 | 12/1989 | Lambropoulos et al. . | |
| 4,882,565 | 11/1989 | Gallmeyer | 340/461 |
| 4,899,975 | 2/1990 | Suman . | |
| 4,909,470 | 3/1990 | Clark . | |
| 4,953,305 | 9/1990 | Van Lente et al. . | |
| 4,988,992 | 1/1991 | Heitshel et a l. . | |
| 5,016,996 | 5/1991 | Ueno | 340/441 |
| 5,028,919 | 7/1991 | Hidaka | 340/825.72 |

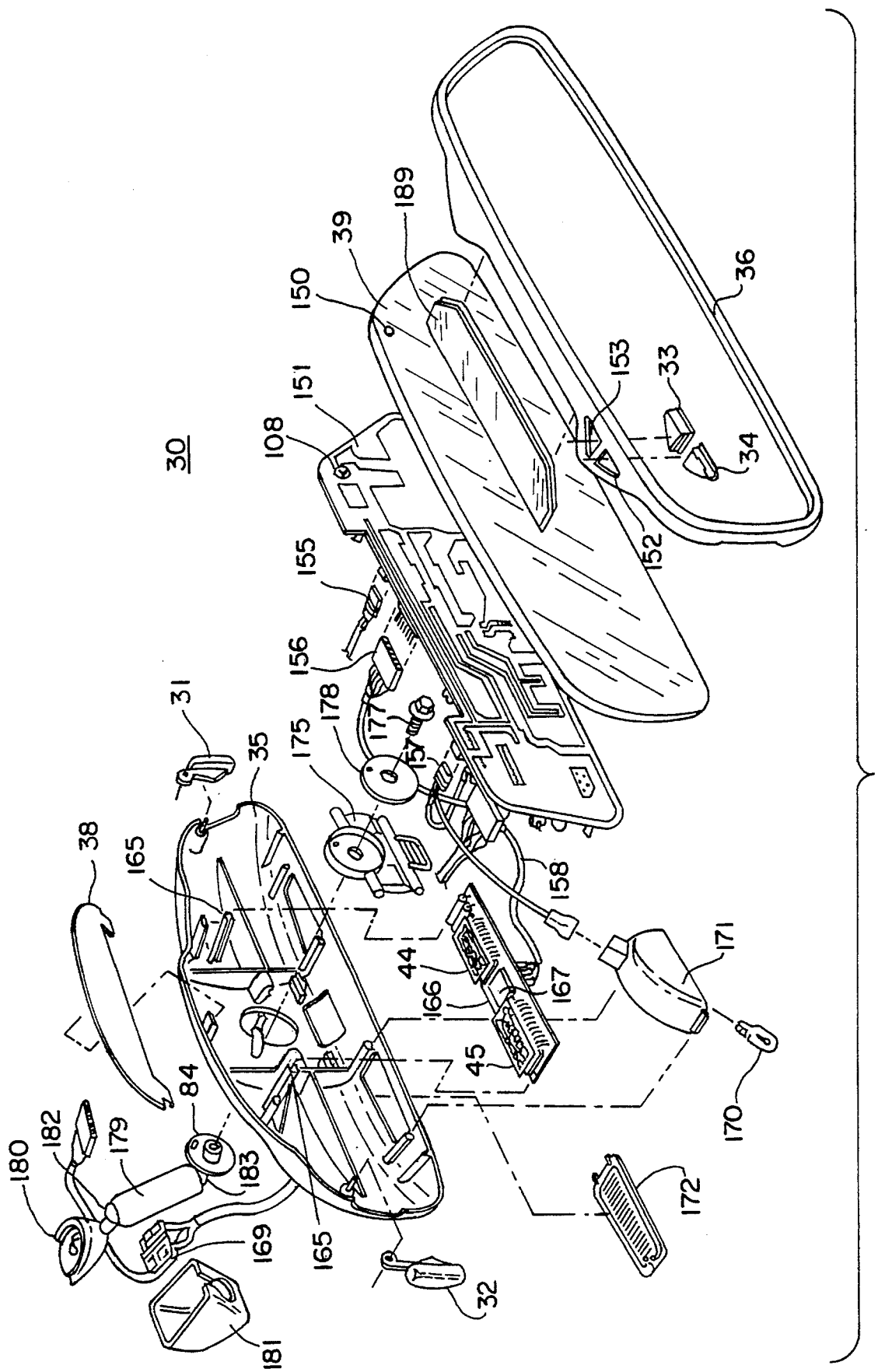

ELECTRICAL CONTROL SYSTEM FOR VEHICLE OPTIONS

This application is a continuation-in-part of U.S. patent application Ser. No. 07/279,643, now abandoned filed Dec. 5th, 1988 and entitled MIRROR COMPASS, the disclosure of which is incorporated by reference herein.

BACKGROUND OF THE INVENTION

The present invention pertains to an electrical control system for vehicle accessories.

Vehicles are often provided with a variety of accessories. In mounting these accessories within the vehicle, it is known to provide them in or on the dashboard, in overhead consoles, mounted to a rearview mirror, or even within the rearview mirror housing itself. However, each of these locations may interfere with an operator's vision. When a visual accessory is located in the dashboard, a driver will have to look away from the road to see the display of the accessory. Accessories located on the dashboard or positioned below the rearview mirror may obstruct the driver's field of vision in front of the vehicle. By providing an accessory in a portion of the rearview mirror itself, an operator's vision behind the vehicle may be at least partially obstructed by the accessory.

Modern vehicles are typically manufactured to accommodate a variety of different electronic accessories each with their own separate circuitry. Typically, this occurs since different suppliers exist for the various vehicle accessories. However this results in redundancy of electrical components, and accordingly increases the total cost of providing all of the accessories. One alternative to providing separate circuitry for each accessory is to provide several accessories as part of a single expensive unit, such as an electronic dashboard. A problem with these units is a failure of any portion of the unit may require its replacement or costly repair. This cost of replacement or repair may be significantly increased by the difficulty in accessing these units.

Electrically operated garage door openers are a popular vehicle and home accessory. Their operation typically requires the use of a remote transmitter which is battery powered and which is carried in the homeowner's vehicle for transmitting radio frequency signals which are received by a garage door opener receiver for controlling the garage door opening mechanism attached to the garage door. In the prior art, the garage door transmitters have consisted of an enclosure with a battery which must be periodically replaced. The unit is portable and vehicle owners typically either clip them to the vehicle's visor or in some cases they are removably mounted to the dashboard.

There exists several inconveniences with such prior art units, the first being that with the portable unit it is necessary to move the unit into an optimum position for operation of the garage door which is usually in the windshield area. Thus, if the portable unit is mounted on the dashboard, it must be removed from the dash and directed toward the garage door for operation. If it is mounted on the visor, it can become a safety hazard in the form of a relatively hard projection at the head level in the vehicle. Further, it obstructs motion of the visor which, when moved, sometimes knocks the transmitter from the visor. Thus, such an arrangement interferes with visor use and posses a safety threat.

Another popular vehicle accessory is an electronically adjustable rearview mirror. Typically, these mirrors include a control mechanism for adjusting the amount of light reflected to the driver. These mirrors will accordingly include a glare threshold, which is the amount of light sensed by the mirror which causes it to adjust its reflectivity. Each driver must manually adjust the mirror if they wish to have it set according to there own preference. These prior art mirrors may be inconvenient when several drivers are sharing a vehicle. Each driver will have to adjust the mirror following use of the vehicle by another driver. Furthermore, a driver may not discover the mirror was adjusted by another driver until the glare from the mirror disturbs his vision. Thus the mirror will have to be adjusted while the driver is operating the vehicle and when the glare from the mirror makes it difficult for the driver to see the road.

SUMMARY OF THE INVENTION

The system of the present invention represents an improvement over the prior art by providing improved electronic accessories. In one embodiment of the invention, electronic accessories are provided in a vehicle rearview mirror housing. In one preferred embodiment of the invention, a display is provided by a reflector which reflects temperature and/or vehicle heading information, which is displayed on electronic circuitry within the mirror assembly housing, for viewing from the front of the rearview mirror.

Another system embodying the invention comprises an electronically adjustable mirror which has adjustable parameters for controlling its reflectivity. In one preferred embodiment of the invention, each vehicle operator may have mirror parameters stored according to their own preference. In one embodiment of the invention, the mirror parameters may be set according to the identification code of a keyless entry key fob used to access the vehicle. Accordingly, each vehicle operator's preferences will be automatically retrieved from a memory in response to a user's keyless entry signal being used to access the vehicle. In one system embodying the invention, the electronically adjustable mirror control is provided in a rearview mirror assembly.

Another system embodying the present invention includes a trainable transmitter for generating a control signal which is provided as part of a structural vehicle accessory. Thus the trainable transmitter may be provided within a visor, a roof console, a rearview mirror, or the like. In one embodiment of the invention, the trainable transmitter is trained by receiving and storing a control signal from a remote transmitter, which generates the control signal for remotely activating an electronic garage door mechanism. The transmitter will transmit the stored signal to activate the garage door mechanism in response to a user actuated control signal. In one embodiment of the invention, the trainable garage door transmitter is provided by circuitry also used for implementing other electronic vehicle accessories, such as a keyless entry system, a compass, or an electronically adjustable mirror.

These and other features, objects and advantages of the present invention can best be understood by referring to the following description of the invention together with reference to the accompanying drawings in which:

BRIEF DESCRIPTION OF THE DRAWINGS

FIG. 4 is an exploded perspective view of the construction of one embodiment of the invention including a rearview mirror;

DETAILED DESCRIPTION OF THE PREFERRED EMBODIMENTS

Figure 1:
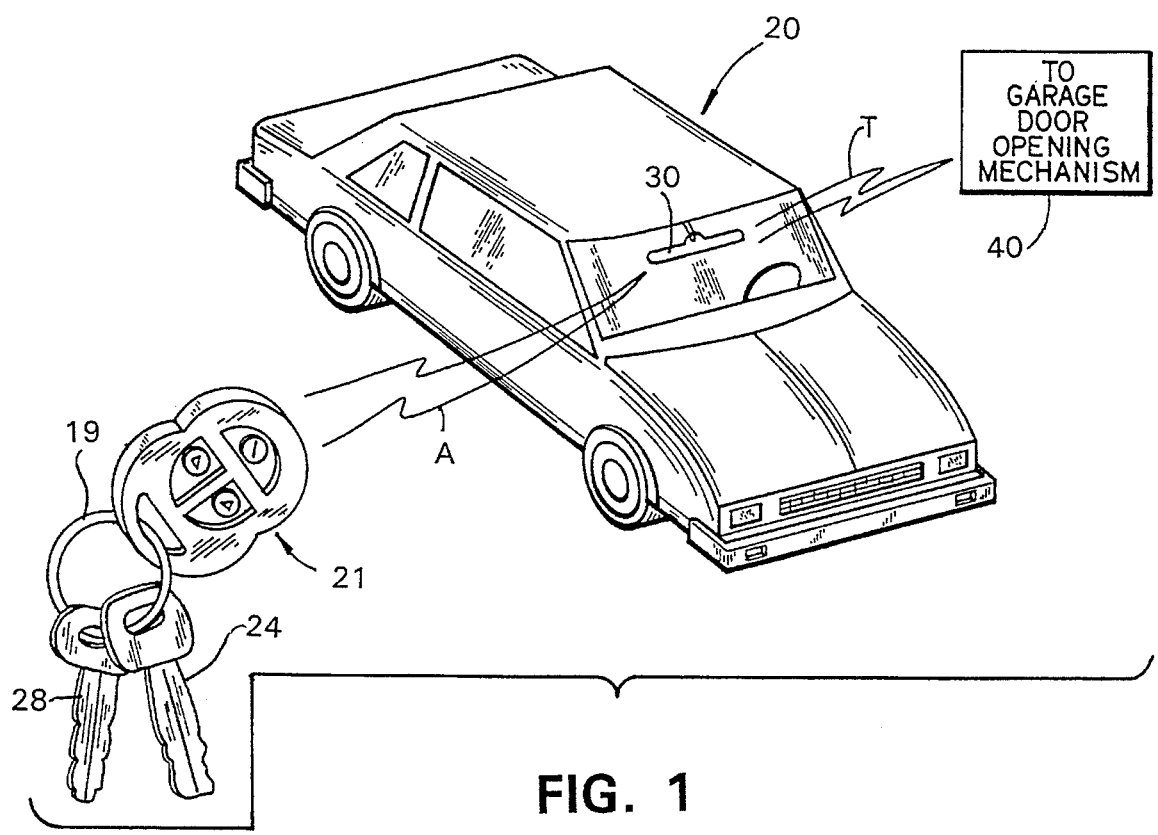
FIG. 1 is a pictorial view of a vehicle including one embodiment of the system of the present invention.

Referring initially to FIG. 1 there is shown a vehicle 20 embodying the system of the present invention. In the example shown, the vehicle is an automobile which typically will include 2 or 4 doors, possibly a sliding side door and a lockable hatch trunk. The system of one embodiment of the invention also includes, as illustrated in FIG. 1, a relatively small remote transmitter 21 in the form of a key fob which may include a key chain 19 for carrying an ignition key 24, a house key 28, or the like. However, as will become apparent, no keys are necessary for ingress to a locked vehicle. In the embodiment of the invention utilizing the transmitter 21, its coded radio frequency (RF) (or infrared) energy is transmitted as indicated by arrow A in FIG. 1 to a transceiver 50 (FIG. 9a) of a control module which may be mounted inside a rear view mirror 30 of the vehicle as illustrated in FIG. 1 or other suitable locations. The transceiver receives the encoded transmitted energy, demodulates it, and a programmable control circuit coupled to the receiver responds to signals therefrom to provide a variety of selected control functions. A detailed description of the operation of key fob 21, the control signals generated therefrom, and flow diagrams of a program employed in a microcontroller for processing the remote keyless entry signal is presented in U.S. application entitled VEHICLE SYSTEMS CONTROL, Ser. No. 07/467,541, filed on Jan. 19, 1990, the disclosure of which is incorporated herein by reference. The system of one embodiment of the invention includes, in mirror assembly 30, a transceiver 50 which selectively transmits coded RF energy as indicated by arrow T to a garage door opening mechanism 40. The conventional garage door opening mechanism is responsive to the control signal for opening and closing a garage door. The programmable control circuit controls transceiver 50 (FIG. 9a) to generate a carrier signal and modulate a binary code onto the carrier signal to generate the control signal. The operation of the programmable control circuit and the transceiver 50 are described in detail below.

Figure 2:
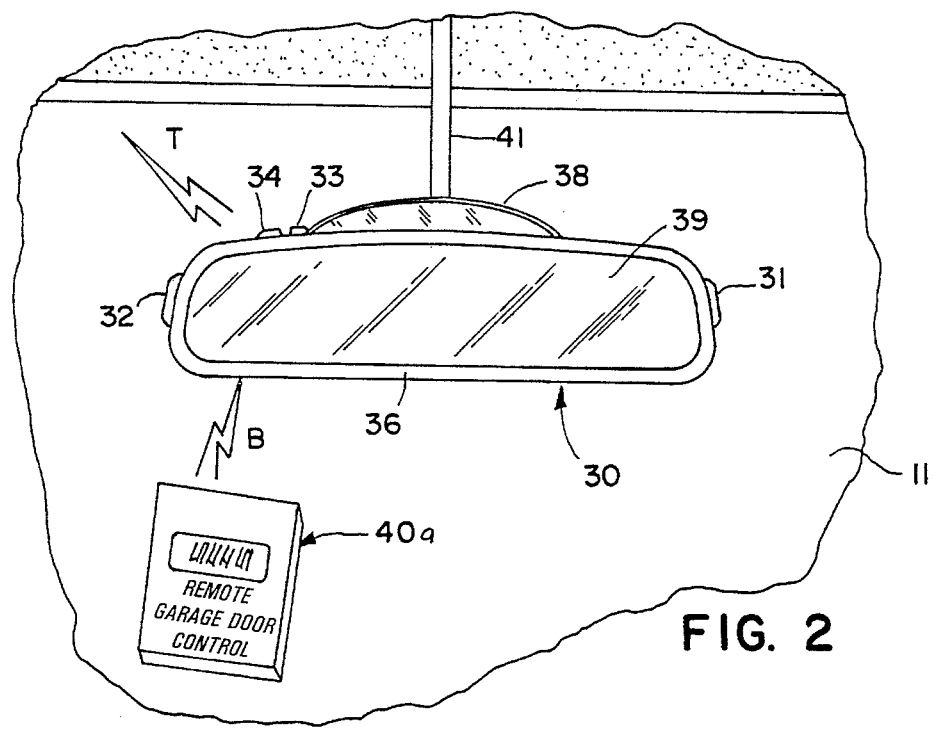
FIG. 2 is a fragmentary front elevational view of one embodiment of the invention including a trainable garage door opener.
Figures 3, 5:
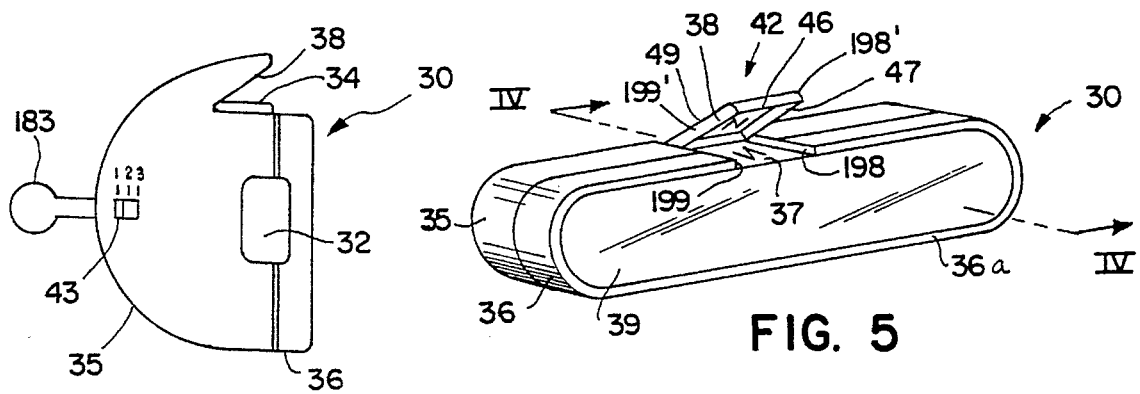
FIG. 3 is a left side elevational view of the embodiment shown in FIG. 2.
FIG. 5 is a perspective view of a second embodiment of the invention including a rearview mirror.

Referring now to FIGS. 2 and 3 which illustrate one embodiment of the invention in the environment of a rearview mirror, a mirror assembly 30 includes four switches 31–34 mounted within a housing 35. The system also includes a temperature and compass display 38, above the housing, and a rearview mirror 39. Mirror assembly 30 includes a control module (FIGS. 9a and 9b) which is located within housing 35 (FIG. 4) and initially receives a radio frequency control signal B from a remote transmitter 40a in a training mode, and later transmits a remote control signal T to garage door opener control mechanism 40 (FIG. 1). Remote transmitter 40a is typically provided with the garage door opening mechanism 40 (FIG. 1), and generates a control signal for remotely actuating garage door opening mechanism 40. The control module in mirror assembly 30 detects and stores the signal transmitted by remote control 40a as described below.

In one embodiment of the invention, mirror 39 is an electronically adjustable mirror, which adjustment may be provided by an eletrochromic mirror, an electronically adjustable prism, or any other suitable mirror adjustment device, to control the reflectivity of the mirror according to the driver's needs. Switches 31 and 32 actuate right and left maplamps (not shown) located in the bottom wall of the mirror front bezel 36 and rear housing 35 (FIG. 3). Switch 33 (FIG. 2) is an electrically adjustable mirror (EAM) train switch which controls an internal control circuit to train the mirror according to current light conditions, as described below with respect to FIGS. 13a–13c. Switch 34 is a garage door opener (GDO) switch which selectively controls a microcontroller 100 (FIG. 9B) either to transmit RF signal energy T, using transceiver 50, for activating the garage door mechanism 40, or to control the microcontroller program receive and store the control signal which transmitter 40a generates, as described below with respect to FIGS. 12a–12c. By receiving and storing the control signal from remote transmitter 40a, the microcontroller is trained to later transmit signal energy T which will be effective to actuate mechanism 40. The mirror housing 35 is attached to the windshield 11 of vehicle 20 or to the edge of the roof in a conventional manner including a ball mount 183 (FIGS. 3 and 4) while a sheath 41 may be provided to conceal electrical conductors running from the mirror housing 35 to the remainder of the electrical circuits in vehicle 20.

The assembly 30 further includes a reflector 38 mounted to the top of the rearview mirror housing to provide a reflection of reverse image vacuum fluorescent displays 44 and 45 (FIG. 4) which are mounted horizontally within housing 35. By mounting the reflector on top of the mirror, it will not interfere with the driver's field of vision below the mirror. Use of a reflector 38 also allows the display driver source to be mounted on a circuit board within the mirror assembly 30 and provides a display which can be viewed from the front of the mirror without limiting or interfering with the reflective surface area of mirror 39. Additionally, by mounting reflector 38 on mirror assembly 30 it is automatically adjusted for easy viewing by the vehicle operator when mirror assembly 30 is adjusted to position mirror 39 for optimum viewing behind the vehicle. A three-way switch 43 (FIG. 3) allows the vehicle operator to select one of three different control signals for actuating three different remotely controlled mechanisms as described below.

The mirror construction is illustrated in FIG. 4. Mirror assembly 30 includes a housing constructed from rear housing 35 and front mirror frame or bezel 36. Frame 36 includes two apertures, 152 and 153, which receive push-button switches 34 and 33, respectively. Mirror 39, which may be an eletrochromic mirror of conventional design, is positioned behind frame 36. Mirror 39 includes an aperture 150 which passes light to a front photocell 108. Photocell 108 is mounted on a printed circuit board 151 which is positioned behind mirror 39. Printed circuit board 151 carries most of the electrical components illustrated in FIGS. 5A and 5B. Display sources 44 and 45 as well as a conventional display driver 167 are supported on a display circuit board 166 supported in guide posts 165 extending horizontally from housing 35 near its top. Although a pair of display sources 44 and 45 are shown, a single display source which displays both the temperature and the vehicle heading simultaneously may be provided. The electronic displays may be provided by commercially available vacuum fluorescent displays, light emitting diodes, or other suitable display devices. The reflector 38 is preferably provided by reflective black plastic as this will prevent multiple images from appearing on the reflector, and thus provides a single clear image. A light transmissive filter 189 covers display sources 44 and 45 and is mounted to an aperture in lining 35 for focusing the image from display sources 44 and 45 on the reflector 38, and may also be used to control the color of the image reflected by reflector 38. A conductor 156 couples display circuit board 166 to a microcontroller on printed circuit board 151. A flux-gate sensor 169 of compass circuit 86 (FIG. 9a) is also coupled to the rest of the compass circuitry on printed circuit board 151 by conductor 158. A left maplamp light 170 is mounted within a parabolic reflector 171 and behind a lens 172. The left maplamp is connected to the control circuitry carried by printed circuit board 151 by connector 157. The right maplamp (not shown) is similarly constructed and is connected to circuit board 151 by connector 155. Pushbutton switches 31 and 32, and reflector 38, are mounted within housing 35. A conventional manual day/night adjuster 175 may be provided for manual adjustment of mirror assembly 30 for day and night operation. A bolt 177, placed through washer 178, day/night adjuster 175, and housing 35, connects the mirror assembly 30 to a channel mount bracket 184. Channel mount bracket 184 includes an aft ball 183 which is held by channel sleeve 179. A bracket 180, which is typically secured either to the windshield of a vehicle by means of an adhesive or to a vehicle roof, includes a fore ball 182 which is held by channel mount sleeve 179. The fore and aft balls 182 and 183 allow user adjustment of mirror 30. A channel mount cover 181 covers a flux-gate coil magnetic field sensor 169 and bracket 180.

Figure 6:
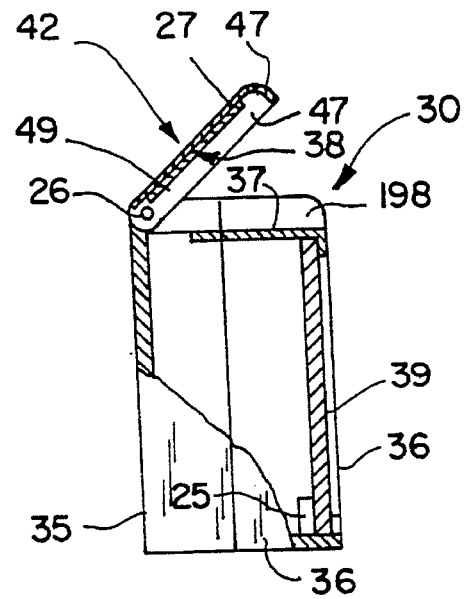
FIG. 6 is an enlarged fragmentary cross-sectional view taken partly along section line VI—VI of FIG. 5.

Referring now to FIGS. 5 and 6, an assembly 30 of a second embodiment includes a mirror 39 and a selectively positionable reflector assembly 38. The rearview mirror assembly includes a bezel 36 and a housing 35. The bezel 36 serves to retain the mirror 39 in place against a front edge 36a of bezel 36.

Bezel 36 has a display source 37, which may be a vacuum fluorescent or other suitable type of display, mounted along a top portion thereof, and upstanding side walls 198 and 199 disposed on either side of display source 37. The display source 37, preferably is a digital display which is controllable, as described below with respect to FIGS. 10, 12a, 12b, 12c, 13a, 13b, 13c, 14a and 14b, to display information to a driver or a passenger of the vehicle in which mirror assembly 30 is mounted. The bezel 36 pivotably supports a reflector element 42 and also has upstanding side walls 198' and 199' which are respectively generally coplanar with the upstanding side walls 198 and 199 of bezel 36.

The pivotable display reflector assembly 42, is shown in its upstanding or open position in FIG. 5, and reflects indicia 46 from the reflective surface 38 thereof. The reflective surface 38 is surrounded by a generally concave wall 47. The pivotable display reflector element 38 has a cover surface 49 which is on the opposite side of the display assembly 42 from the reflective surface 38, and which is visible as an upper surface of assembly 30 when the display assembly 42 is in its closed position as shown in FIG. 5a.

Figure 5A:
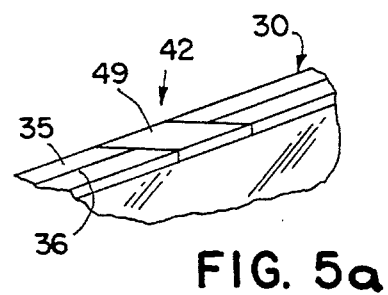
FIG. 5a is a fragmentary perspective view of a portion of the rear view mirror of FIG. 5, showing the display member in its closed position.

As seen in FIG. 5a, the pivotable display assembly 42 is preferably received flushed between the upstanding side walls 198, 198' and 199, 199' (FIG. 5). In FIG. 5A, the pivotable display assembly 42 completely covers and overlies display source 37 (FIG. 5) which itself bears the display to be reflected.

FIG. 6 shows a portion of the side walls of the bezel 36 and housing 3-5, which are broken away to show the interior structure of the rearview mirror assembly 30. The circuitry within assembly 30 is not illustrated in FIG. 6, however, it is of similar construction to that shown in FIG. 4. The front edge 36 a (FIG. 6) of bezel 36 retains mirror 39 within assembly 30, while at least one support member 25 retains the mirror 39 in position from the interior of assembly 30.

The display reflector element 38 is shown in section in FIG. 6, and preferably includes reflective black plastic as indicated above; but it may include glass with a reflective mirror surface, or a highly polished metal surface. The element having the reflective surface 38 can be glued or otherwise attached to the interior side of the surface 27 of the pivoted cover 49 for pivoting together with the surface 27 about a hinge 26. A pair of hinges are preferably provided, one (i.e., hinge 26) passing through the wall 198 as seen in FIG. 6, and the other hinge (not shown) passing through wall 199.

The display element 37 is preferably a reverse vacuum fluorescent display so that its reflected image, reflected against element 38, will be readable to the driver of the vehicle. Alternate forms of display include a back-lit liquid crystal display and light emitting diodes (LEDS). For example, red and white LEDs emit sufficient light to provide an image on reflector 38 which may be easily viewed by the vehicle driver.

Figure 7:
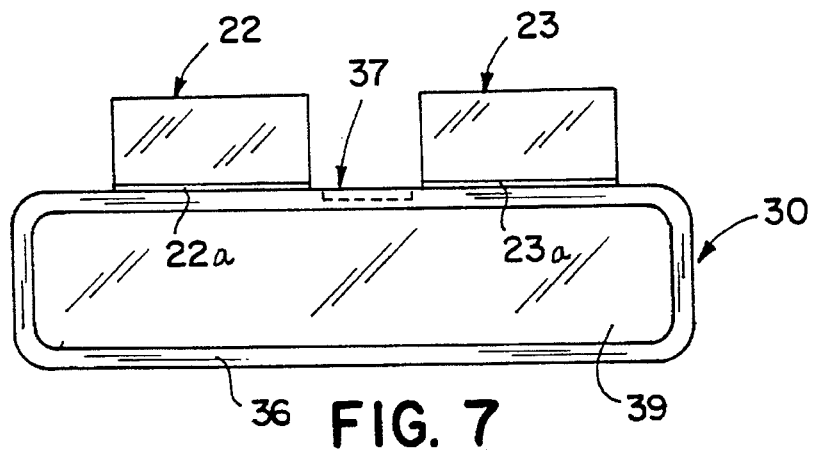
FIG. 7 is a front elevational view of another embodiment of the invention having a pair of display mirrors.

FIG. 7 is a front elevation view of another embodiment of a rear view mirror for a vehicle, illustrating assembly 30 having a mirror 39, a display source 37 (shown in dotted outline), and a bezel 36 for retaining mirror 39 in place. A pair of reflectors 22 and 23 are disposed to the left and to the right, of the center of assembly 30. Reflector 22 is supported by a support arm 22a, and the reflector 23 is supported by a support arm 23a. The reflectors 22 and 23 are mounted such that the driver and the passenger in the vehicle can simultaneously view the display 37 reflected by the reflectors 22 and 23, respectively.

Figure 8:
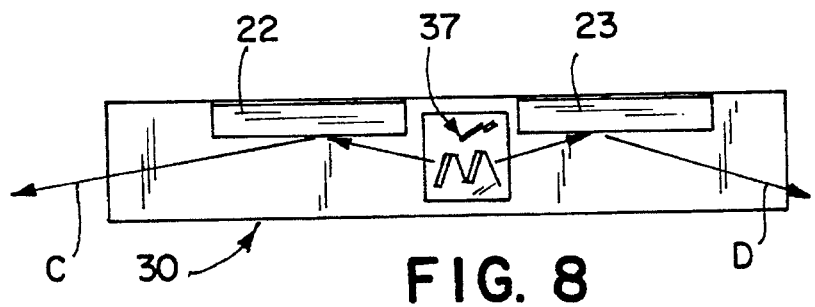
FIG. 8 is a top plan view of the embodiment shown in FIG. 7.

The top view of mirror assembly 30 shown in FIG. 7 is illustrated in FIG. 8, wherein display element 37 is shown displaying an inverted letter "W" which is to be reflected by the reflectors 22 and 23. A pair of light rays C and D illustrate schematically the reflection of the upside-down letter "W" by reflectors 22 and 23 respectively. Thus reflector 22 supplies an inverted reflection of the display element 37 to the driver as indicated schematically by the ray C and reflector 23 supplies an inverted image of the display element 37 to the passenger as indicated schematically by the ray D.

Having briefly described the overall preferred mounting environment of the system and its relationship to a vehicle, a detailed description of the preferred embodiment of the invention is now presented in connection first with the circuit diagrams of FIG. 9a and FIG. 9b and subsequently with the program flow diagrams of FIGS. 10a through 15d.

Figure 9A:
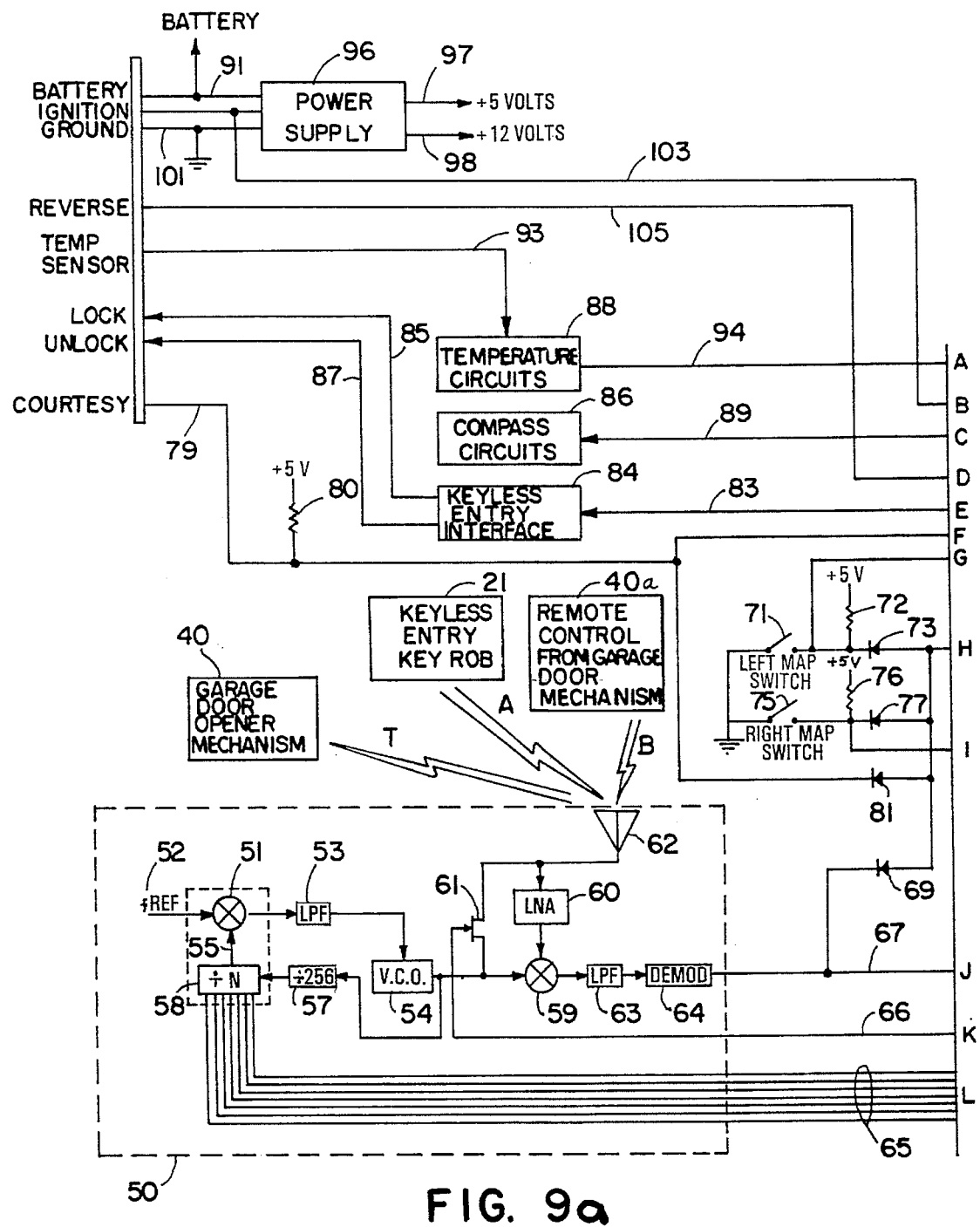
FIGS. 9a and 9b is an electrical circuit diagram partly in block form of a programmable control circuit and transceiver embodying the present invention.

Referring to FIG. 9a, a radio frequency transceiver circuit 50 is mounted within housing 35 of rear view mirror 30. Radio frequency circuit 50 includes a mixer 51 which mixes a reference frequency 52 and a signal on an output 55 of a controllable divider 58. Reference signal 52 is a fixed frequency signal which may be generated from a commercially available color burst type T.V. crystal generating approximately a 4 MHz signal. The controllable divider 58 may be a commercially available 145151 or 145106 integrated circuit, or any other suitable controllable divider. The output signal from mixer 51 will contain DC and AC components. A low pass filter 53 is provided to remove AC signals from the output signal of mixer 51. The DC signal output by low pass filter 53 is provided as a control input to a voltage control oscillator (V.C.O.) 54. The output of the voltage controlled oscillator will increase or decrease according to the magnitude of the control input provided from low pass filter 53. The output of the V.C.O. 54 is connected to a divide-by-256 divider 57, a switch 61, and a second mixer 59.

Controllable divider 58 receives the output signal from fixed divider 57 and provides an output signal having a frequency determined by a control byte received from output terminals 1021 (FIG. 9b) of microcontroller 100 via bus 65. Mixer 59 also receives the output of a low noise amplifier 60 which amplifies signal energy A and B received by antenna 62 and transmitted from keyless entry key fob 21 and remote transmitter 40a, respectively. If the garage door opener is not used with a keyless entry system, low noise amplifier 60 is not required, and consequently, a resistor, pin diode, or any other suitable conditioning circuit could be used to connect antenna 62 to mixer 59. A transmit/receive FET switch 61 is controlled by a signal supplied from output 1022 of microcontroller 100 via line 66 to provide a carrier signal from V.C.O. 54 to antenna 62. Switch 61 selectively connects V.C.O. 54 to antenna 62 as well as modulating a control byte, as described below, onto the carrier signal generated by V.C.O. 54. Signal energy T will thus be transmitted by transceiver 50 in response to the closing of switch 34 (FIG. 2) to actuate electronic garage door mechanism 40 (FIG. 1). The output of mixer 59 is provided to low pass filter 63, which removes signals above approximately 1 KHz. A demodulator 64, which may be a resistor and a capacitor integrator circuit will further condition the output of low pass filter 63 to provide a DC level which the microcontroller will use to determine when RF data is being received by transceiver 50 as described below with respect to FIGS. 15a–15d.

A microcontroller 100 controls the circuit operation and may be a commercially available IC 68HC05B6, which includes a nonvolatile memory 115; however, any appropriate microprocessor may be used. FET switch 61 receives a transmit/receive select signal from output terminal 1022 of microcontroller 100 via conductor 66. The output of demodulator 64 is provided to the RF data input terminal 1023 of the microcontroller via line 67. As indicated above, the control input to divider 58 is coupled to output terminals 1021 via conductors 65.

An interrupt input terminal 1008 of microcontroller 100 is connected to receive interrupt signals from several input sources. Thus, demodulator 64 is connected via a diode 69 to interrupt input terminal 1008 of the microcontroller. Interrupt input terminal 1008 is also coupled to a left maplamp switch 71 through a pull up resistor 72 and a diode 73. A right maplamp switch 75 is similarly coupled to interrupt input terminal 1008 of microcontroller 100 via a pull up resistor 76 and a diode 77. The cathodes of diodes 73 and 77 will be held at a high logic level (approximately 5 volts) by pull-up resistors 72 and 76, respectively, until switch 71 or switch 75 is closed, which will lower the cathode potential to a low logic level (ground potential). A courtesy input 79 is coupled to interrupt input terminal 1008 of microcontroller 100 via pull up resistor 80 and a diode 81. The courtesy input 79 has a high logic level when all the vehicle doors are closed. Pull up resistor 80 thus holds the cathode of diode 81 at a high logic level when the vehicle doors are closed. When one or more of the vehicle doors are open, courtesy input 79 will have a low logic level thereon, which will cause the cathode of diode 81 to be at a low logic level. Pull up resistor 82 holds input terminal 1008 high until the cathode of one of the diodes, 69, 81, 73, or 77, is brought to a low logic level, which will cause the diode having a low logic level on the cathode to be forward biased to pull input terminals 1008 to a low logic level. Switch 71 is connected to left maplamp input terminal 1007 and switch 75 is connected to right maplamp input terminal 1009. Input terminals 1009 and 1007 of microcontroller 100 will have low logic levels thereon when switches 75 and 71, respectively, are closed. Input terminal 1006 is connected to the courtesy input via conductor 79, and it will have a low logic level thereon when the courtesy input is at a low logic level indicating one of the vehicle doors is open. As explained below, the demodulator will provide a low logic level to RF input terminal 1023 when RF the output of V.C.O. 54 and a signal received via antenna 62 are at substantially the same frequency. As described below in connection with the flow diagrams of FIGS. 11a through 15d, the microcontroller program is responsive to an interrupt, which will be detected by interrupt terminal 1008 having a low logic level thereon, for reading the input terminals 1006, 1007, 1009, and 1023 to determine the source of the interrupt. The microcontroller will then control the maplamps, the transceiver, etc., on the basis of which input terminal, 1006, 1007, 1009, or 1023, has a low logic level thereon simultaneously with the interrupt input terminal 1008.

A bus 83 connects a keyless entry output 1005 of the microcontroller to the keyless entry interface circuit 84. The keyless entry interface provides an output signal on lead 85 which will lock the doors of the vehicle, or an output on lead 87 which will unlock the doors, in response to a control signal provided through conductor 83 from output terminal 1005. A bi-directional bus 89 connects microcontroller input/output terminal 1003 to compass circuit 86. A particularly effective compass circuit is described in detail in U.S. Pat. No. 4,546,551, issued Oct. 15, 1985, and entitled ELECTRICAL CONTROL SYSTEM, and U.S. Pat. No. 4,424,631, entitled ELECTRICAL COMPASS, issued on Jan. 10, 1984, the disclosures of which are incorporated herein by reference.

Signals from one or more temperature sensors (not shown) which may be mounted externally and/or internally to the car are connected to a temperature circuit 88 via a conductor 93. Temperature circuit 88 in turn provides an output signal on conductor 94 to the temperature input terminal 1001 of the microcontroller. Temperature sensors may be provided in the form of thermistors, and temperature circuit 88 may comprise a buffer for interfacing between the sensor(s) and microcontroller input terminal 1001.

A power supply 96 provides a regulated +5 VDC reference potential on terminal 97 and a regulated +12 VDC reference potential on terminal 98. Circuits for providing the regulated voltages are well known and accordingly will not be described in further detail herein. Power supply 96 receives power from the vehicle battery via a conductor 99 and a ground conductor 101. A vehicle ignition signal is applied to power supply 96, as well as to microcontroller 100 at ignition sense input terminal 1002, through conductor 103. A signal provided through conductor 105 is applied to a reverse sense input terminal 1004 of the microcontroller so that the microcontroller may determine if the vehicle is in reverse. A front photocell 108 provides an indication of the ambient light level on the front of mirror 39. A resistor 109 is connected in series with photocell 108 between the +5 VDC reference potential and ground to provide a voltage divider. The junction of the photocell 108 and the resistor 109 is coupled to the front photocell input terminal 1010 of the microcontroller 100 via an analog-to-digital (A/D) converter 102. A rear photocell 111 similarly provides an indication of the ambient light level at the rear side of the mirror assembly 30. A resistor 113 is provided in series with the rear photocell 111 between the +5 VDC battery potential and ground. The junction of photocell 111 and resistor 113 is coupled to the rear photocell input terminal 1011 of microcontroller 100 via an A/D converter 112. Input terminals 1010 and 1011 are converted from analog-to-digital signals by A/D converters 102 and 112 respectively in order provide the microcontroller with an actual indication of the front and rear light levels.

A nonvolatile memory (NVM) 115 is connected to input/output terminal 1012 of microcontroller 100 via a bidirectional bus 115', and retains status information when the ignition of vehicle 20 is turned off. FET switches 116 and 121 are controlled by output signals from terminals 1013 and 1014 of the microcontroller. Switch 116 will actuate left maplamp 117 when either the left map lamp switch 71 is actuated or courtesy input terminal 1006 changes state. Switch 121 will actuate right maplamp 120 when either the right maplamp switch 75 or courtesy input terminal 1006 changes state.

An electrically adjustable mirror (EAM) switch 124 is connected via a pull-up resistor 125 to an EAM train switch input terminal 1015 of microcontroller 100. Switch 124 controls the microcontroller to train mirror parameters for electronic adjustable mirror 135. A garage door opener (GDO) switch 127 is connected to a GDO switch input terminal 1016 of microcontroller 100 via a pull up resistor 128. Switch 127 controls the microcontroller to train to a remote transmitter of a garage door mechanism or to transmit a stored control signal for a garage door mechanism. Display output terminal 1017 of the microcontroller provides display output signals to driver 130 which controls display element 131 to display compass information, temperature information, or any other desired information, to the operator via reflector 38. Display 131 may be provided by a vacuum fluorescent display which draws a large current (on the order of 150 mA). Display driver 130 includes a transistor which will disconnect the display driver to eliminate this large current drain when the vehicle is not turned on.

An EAM output terminal 1018 of the microcontroller provides a drive signal to an EAM interface 134 which interface controls EAM 135 to adjust its reflectivity. A three position slide switch 136 is connected to input terminal 1020 of microcontroller 100 and represents three channels. The slide switch positions correspond to memory locations for GDO control signals. Accordingly, a signal to be transmitted by the trainable transmitter will be retrieved from the memory location corresponding to the slide switch position and a control signal to be stored will be saved at the memory location corresponding to the slide switch position. Each channel thus represents a control signal which will actuate a respective garage door mechanism. A choice of three channels is offered by way of example, and more or less than three channels could be provided. The operation of microcontroller 100 is now described in connection With the flow diagrams of FIGS. 10 through 15d.

Figure 10:
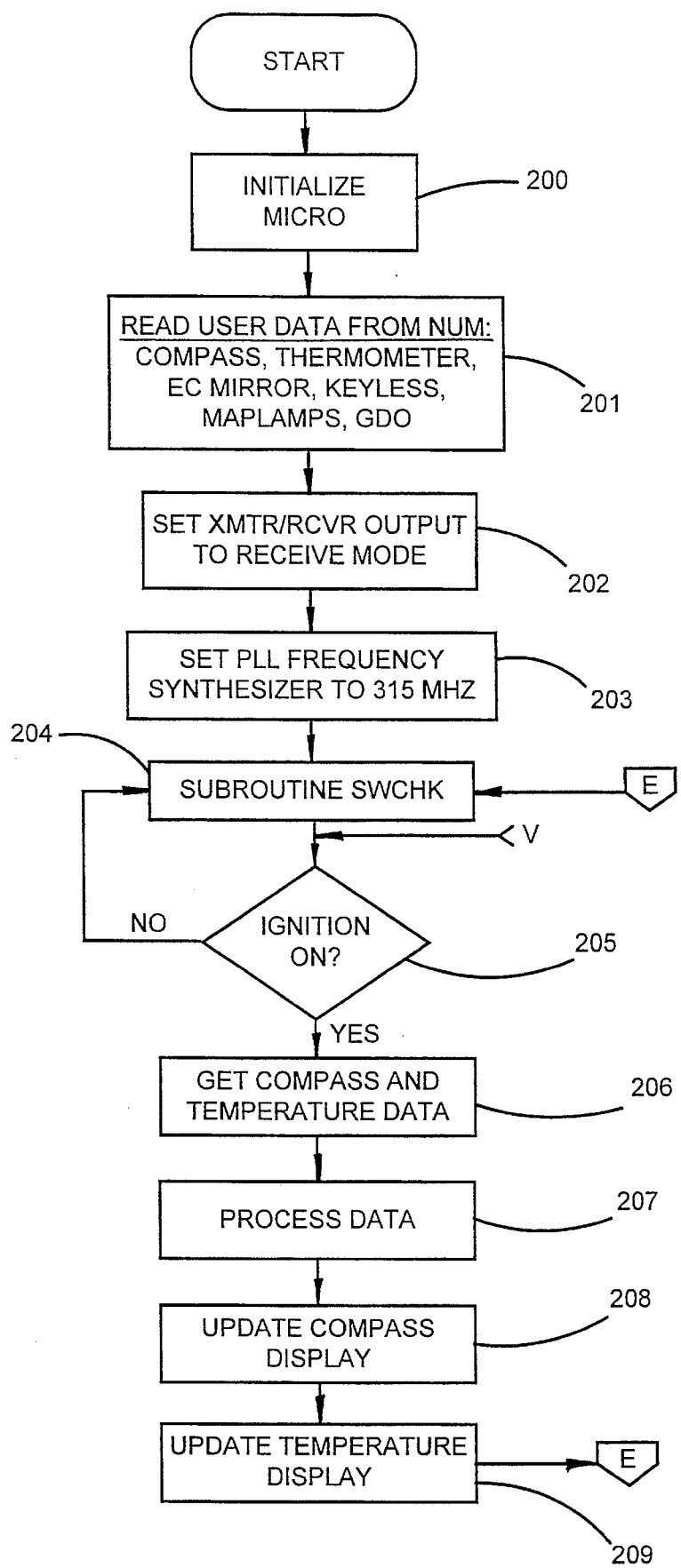
FIG. 10 is a flow diagram of the main program employed in the microcontroller of the programmable control circuit shown in FIG. 9b.

The main program for microcontroller 100 is shown in FIG. 10. The program begins with an initialization block 200 in which the input ports to microcontroller 100 are configured, an internal random access memory (RAM) is cleared, and the control program is loaded from an internal read-only memory (ROM) into the RAM. The program will always be initialized following a disconnection of the battery which causes power supply 96 (FIG. 9a) to be interrupted. In general, the microcontroller will operate in a "stop mode" which will be interrupted by input terminal 1008 going to a low logic level or by the timer interrupt described below with respect to FIGS. 15a through 15d. Interrupt terminal 1008 will be pulled to a low logic level by switches 71 and 75, courtesy input 79, or RF circuit 50. In response to the interrupt input going low, the microcontroller will "wake-up" to respond to a control input. It is also desirable to provide the microcontroller with a hard reset to insure the reliability of the software within the RAM in microcontroller 100. Accordingly, it may be arranged that whenever a keyless entry is made, for example, the microcontroller will reset. Following a reset, the microcontroller will initialize at block 200. Following initialization in block 200, user data is read from nonvolatile memory (NVM) 115 as indicated in block 201 Data stored in memory 115 may include compass data, thermometer data, each driver's electronically adjustable mirror parameters, keyless entry access codes, garage door opener control frequencies, and the current state of the lamp switches. This data will accordingly be transferred from the nonvolatile memory to the microcontroller RAM.

Next, as indicated by block 202, the transmitter/receiver output terminal 1022 will be set to the receive mode (switch 61 will be turned off). The frequency synthesizer of radio frequency (RF) transceiver 50 (FIG. 9a), including mixer 51, low-pass filter 53, voltage controlled oscillator 54, divide-by-256 divider 57, and controllable divider 58, will set voltage controlled oscillator 54 to output a signal having the frequency of the key fob 21 of the keyless entry, as indicated in block 203. This frequency may be 315 MHz, but any satisfactory frequency could be used. The microcontroller program will then proceed to the switch check subroutine SWCHK, which is described below in connections with FIGS. 11a, 11b and 11c, in block 204. Following execution of the SWCHK subroutine, the microcontroller program will determine, as indicated by block 205, whether the ignition is on or off. If ignition input terminal 1002 to the microcontroller indicates the ignition is not on, the program will return to the subroutine SWCHK. If it is determined in the test of block 205 that the ignition is on, the program will proceed to block 206 wherein temperature data will be retrieved from temperature circuit 88 by reading input terminal 1001. Compass data will be retrieved from compass circuit 86 by reading input terminal 1003 or by heading information calculated by the microcontroller using the microcontroller flow diagrams set forth in U.S. Pat. No. 4,546,551 entitled ELECTRICAL CONTROL SYSTEM, incorporated herein by reference. The data retrieved, as indicated by block 206, will be processed by the microcontroller program as indicated by block 207. The compass display will be updated to display the current compass data information as indicated by block 208, and the temperature display will be updated to display the current temperature as indicated by block 209. The microcontroller program will then return the SWCHK subroutine 204 at port E.

Figure 11A:
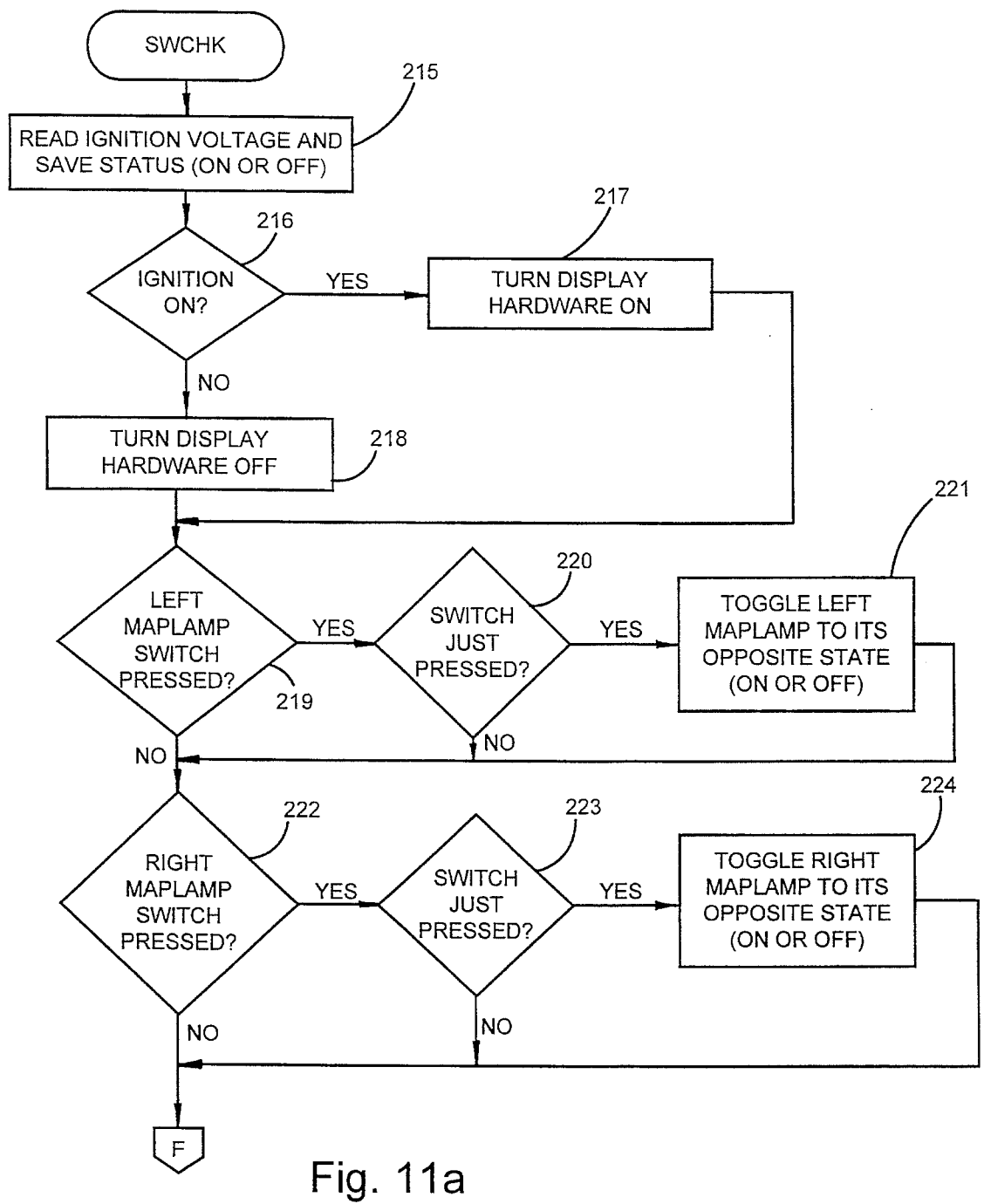
FIGS. 11a, 11b and 11c is a flow diagram for one of the program subroutines shown in FIG. 10.
Figure 11B:
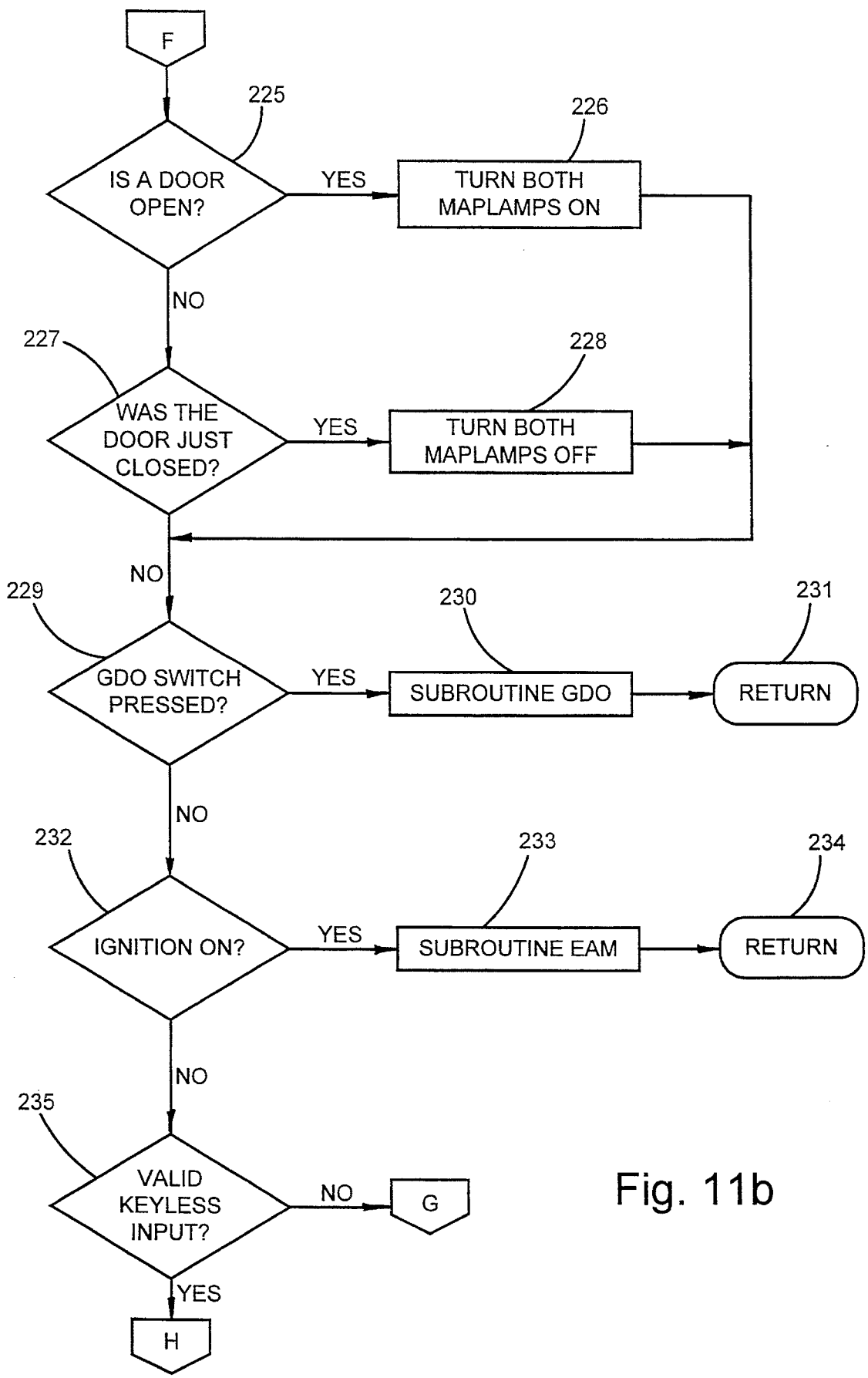
Figure 11C:
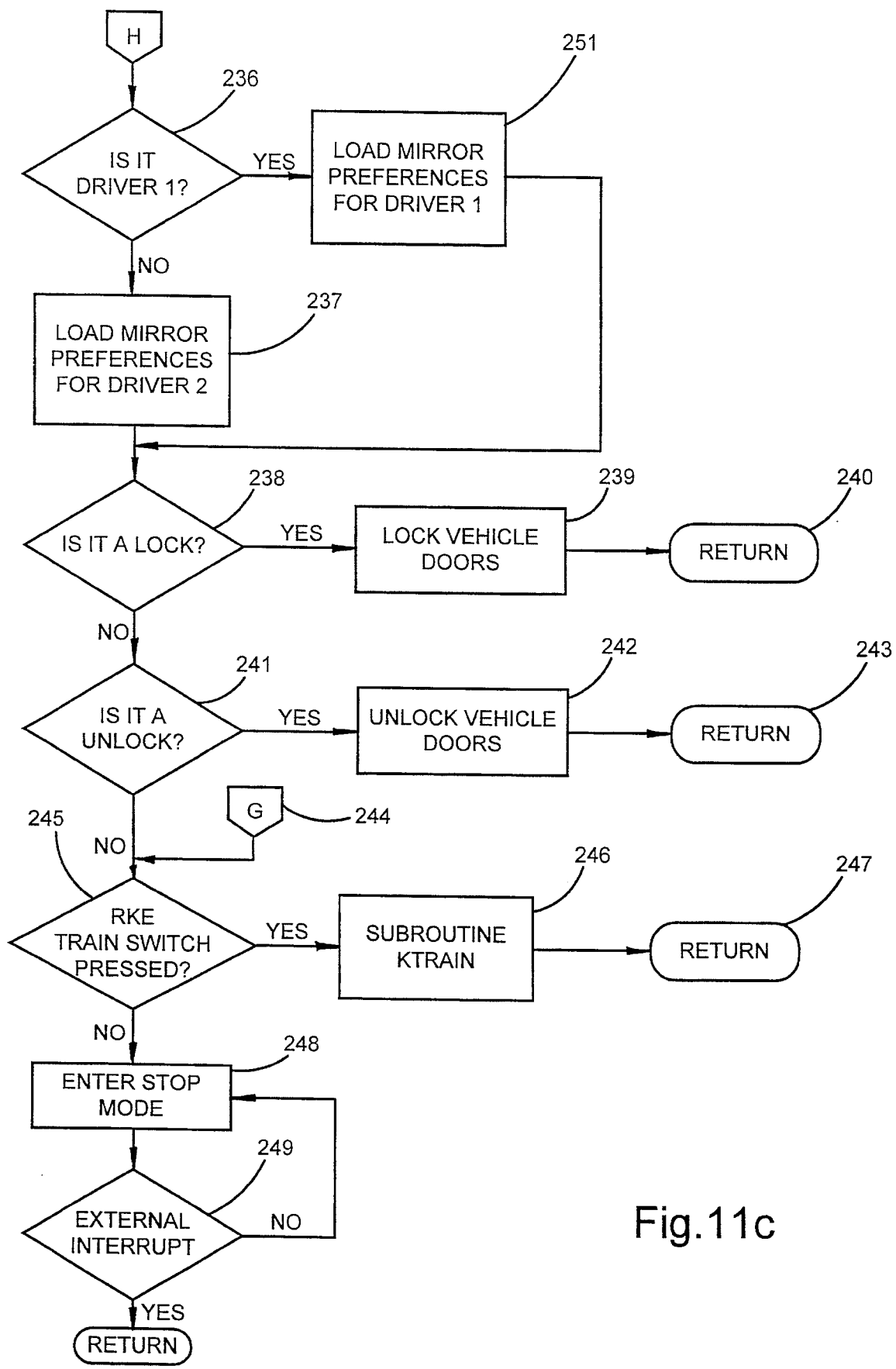

Upon entering the SWCHK subroutine shown in FIGS. 11a, 11b and 11c, the ignition voltage supplied via conductor 103 will be determined by microcontroller 100 reading input terminal 1002, and the status indicated thereby will be saved as indicated by block 215. The microcontroller will determine whether the ignition status saved in block 215 indicates that the ignition is on or off as shown by block 216. If the ignition is on, the display driver 130 (FIG. 9b) will be turned on, as indicated by block 217. However, if the ignition status indicates that the ignition is off, the display hardware 130 will be turned off, to conserve energy, as indicated by block 218. The microcontroller will next determine whether left maplamp switch 71 is closed, as shown in test block 219. If switch 71 is closed the microcontroller will determine if the switch was just closed by test block 220. If switch 71 just closed, the left maplamp will be toggled to its opposite state. Thus, if the left maplamp was off it will be turned on, and if it was on it will be turned off. The microcontroller program will then proceed o the test indicated by block 222. In block 222, the microcontroller program determines whether right maplamp switch 75 is closed. If not, the program will proceed to block 225 as shown by port F. If switch 75 is closed, the program will determine whether switch 75 just closed as indicated by block 223. If switch 75 was not just closed, the program will proceed to block 225. If switch 75 just closed, then the right maplamp switch will be toggled to its opposite state (i.e., it will be switched on if it was off or off if it was on). Thereafter, the program will proceed to block 225. To determine whether the left maplamp switch 71 and the right map lamp switch 75 just closed, the program might determine if the preceding time through the SWCHK subroutine, the status of the switch was the same. Thus, the microcontroller will not change the toggle position of the associated maplamp switch if the corresponding switch has been determined to have been closed two consecutive times through the SWCHK routine. The switch may also be determined to have been just closed by determining whether or not the switch is closed for a predetermined time period, such as five seconds. The purpose of the tests of blocks 220 and 223 is thus to prevent flashing of the maplamps if the switches are held down for an extended period of time.

Next, the microcontroller program determines whether courtesy input terminal 1006 indicates a door is open as indicated by block 225. Whenever a door is open, both maplamps will be turned on as indicated by block 226. If the microcontroller program determines that no door is open, it will determine by the test of block 227 whether the last door to close just closed. If the last door closed just closed, both maplamps will be turned Off as indicated by block 228. The program may determine whether a door just closed by determining the status of the courtesy input terminal 1006 the last time through the SWCHK subroutine. The microcontroller program then proceeds to the test indicated by block 229 where it determines whether GDO switch 127 is closed. If GDO switch 127 is closed, the microcontroller program proceeds to subroutine GDO as indicated by block 230. Subroutine GDO is described below with respect to FIGS. 12a, 12b, and 12c. Following subroutine GDO the program will return to the main program as indicated by block 231. The various subroutines typically feed back into the main program at V (FIG. 10) and the main program proceeds to block 205.

The microcontroller again reads input terminal 1002 to determine whether the ignition is on or off as shown by block 232. If the ignition is on, the program proceeds to subroutine EAM which is the electronic adjustable mirror subroutine described below with respect to FIGS. 13a, 13b and 13c. When subroutine EAM is finished, the program returns to the main program at "ignition on" test block 205. If the ignition is not determined to be on by the test of block 232, the microcontroller program proceeds to the test of block 235 wherein it determines whether a valid keyless entry identification code has been received. If a valid user identification code is not received, the program proceeds through port G (FIGS. 11b and 11c) to block 245. If a valid user identification code is received at input terminal 1005, the program proceeds via port H to the test of block 236, wherein the last received identification code is compared to the identification code stored in NVM 115 for driver one. A valid identification code is one of the user identification codes stored by microcontroller 100 in NVM 115 for driver one and driver two. Furthermore, the identification code used by the microcontroller program for the identification of the driver will not change until a key fob having a different identification code is used to gain ingress to the vehicle. Thus, when a driver merely enters an unlocked vehicle, starts the ignition, and drives away, the microcontroller program will use the identification code of the key fob last used to enter the vehicle. If the microcontroller determines that the identification code for driver one was last received, the mirror information stored in NVM 115 for driver one is retrieved, as indicated by block 251. Once the mirror information for driver one is retrieved, the microcontroller proceeds to the test of block 238. If, however, the microcontroller determines in block 236 that the last valid code received is not the identification code for driver one, then the microcontroller retrieves the mirror parameters for driver two stored in NVM 115, as indicated by block 237. The microcontroller then proceeds to the test of block 238.

As shown by block 238 the microcontroller determines whether the doors are to be locked. If the microcontroller receives a signal to lock a door, or doors, from the keyless entry, it will provide an appropriate control signal on output terminal 1005 for the keyless entry interface 84. Keyless entry interface 84 will in turn provide a logic signal on conductor 85 which will cause a door, or doors, of the vehicle to lock. As indicated by block 240, the microcontroller will then return to the main program and proceed to the "ignition on" test of block 205 therein.

If a lock command has not been received, the microcontroller will proceed to the test indicated by block 241 wherein it will determine whether an unlock command was received from the keyless entry key fob. If an unlock command was received, the microcontroller will provide an appropriate output control signal on output terminal 1005 for the keyless entry interface 84, which will in turn provide the appropriate logic signal on conductor 87 to cause a door, or doors, of the vehicle to unlock.

Following the unlocking of the vehicle doors, the microcontroller will return to the main program at block 205 through port V. If the microcontroller program determines in block 235 that a valid keyless identification code was not received, it proceeds to the test of block 245 through port G. Alternately, if the microcontroller program determines in the test of block 241 that an unlock command was not received, the program will proceed to the test of block 245. In block 245, the program determines whether the EAM train switch 124 and the GDO switch 127 are simultaneously closed. If both switches 124 and 127 are closed, then the program will proceed to subroutine KTRAIN wherein a new key fob code can be trained. The KTRAIN subroutine is described below with respect to FIGS. 14a and 14b. Following the completion of the subroutine KTRAIN, the program returns to the main program at block 205 through port V, as indicated by block 247.

If the microcontroller program determines training switches 124 and 127 are not simultaneously closed, in block 245, the program proceeds to the stop mode, indicated by block 248, to wait for an external interrupt as indicated by block 249. Upon receiving an external interrupt, the microcontroller will return to the main program at block 205 through port V. In the stop mode, the microcontroller program waits for an interrupt from one of switches 71 and 75, RF transceiver 50, and courtesy input 79, which are tied to the interrupt input terminal 1008 of the microcontroller via their respective diodes (see FIGS. 9a and 9b).

Figure 12A:
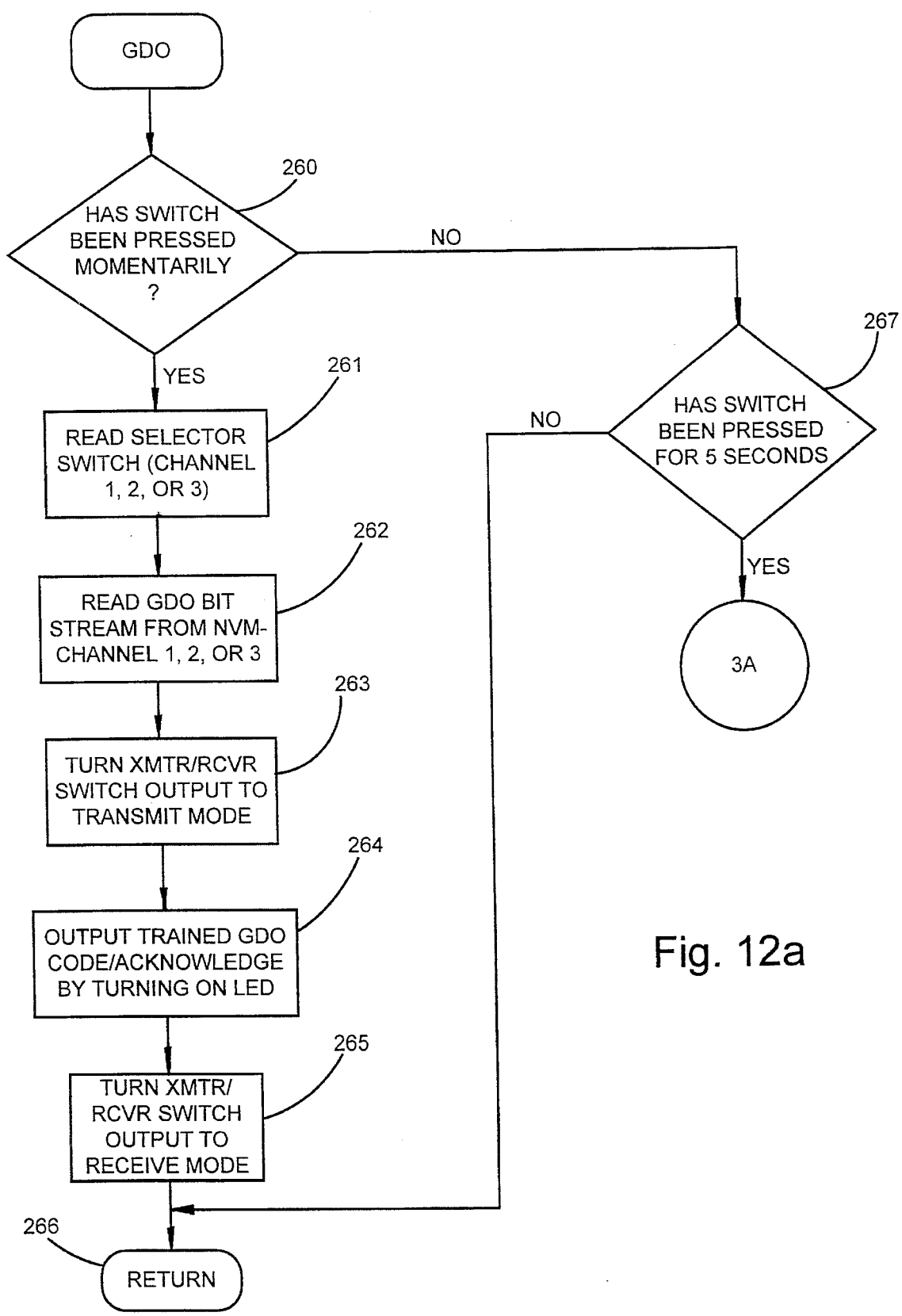
FIGS. 12a, 12b and 12c is a flow diagram for one of the program subroutines shown in FIG. 11b.
Figure 12B:
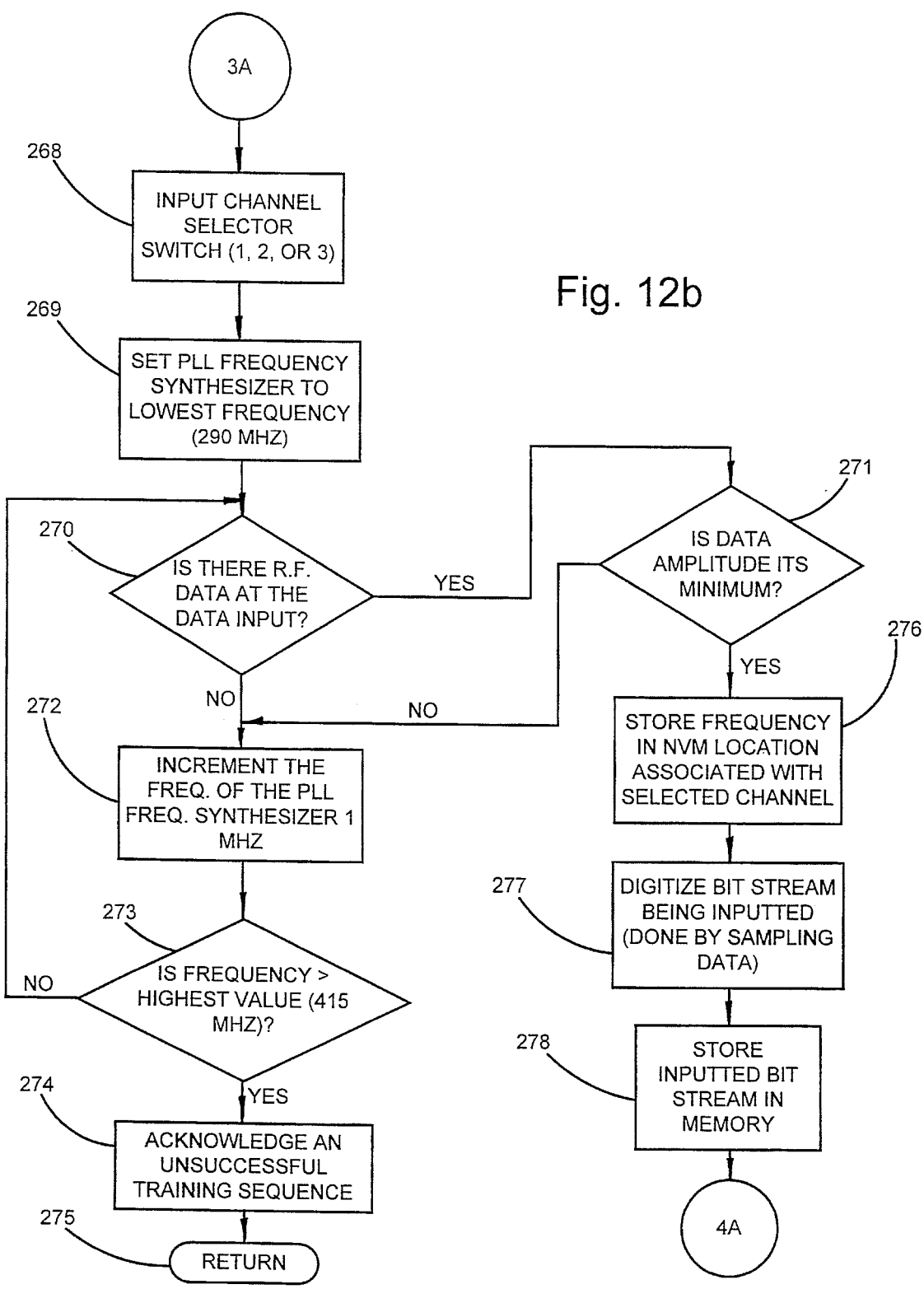
Figure 12C:
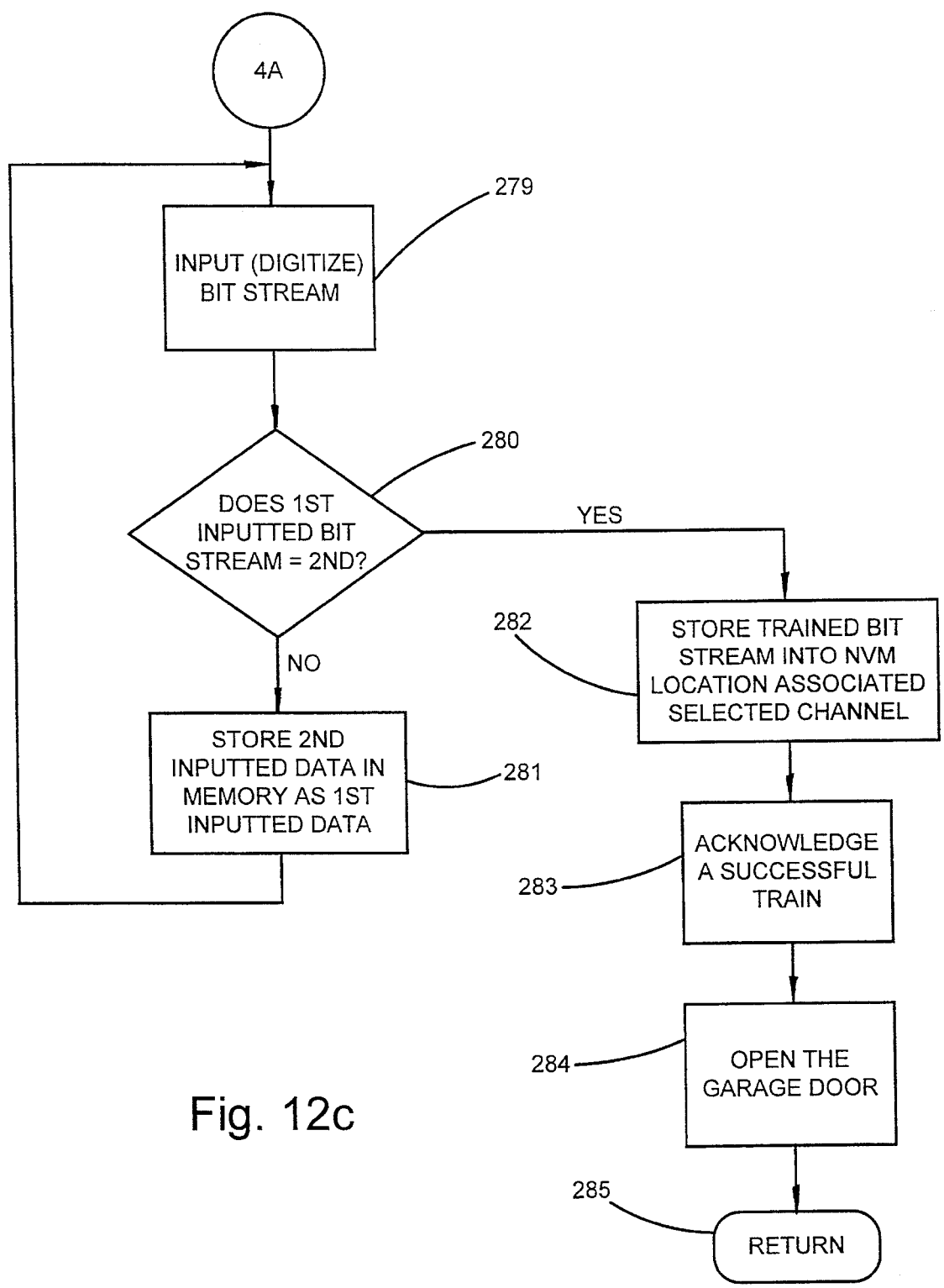

The garage door opener (GDO) subroutine is set forth in FIGS. 12a, 12b, and 12c which shows the flow diagram for a trainable transmitter for transmitting a stored remote control signal which will actuate an electronic garage door opener mechanism 40 (FIG. 1) attached to the garage door based upon the transmittal signal from the conventional transmitter 40a (FIG. 2) supplied with the garage door control mechanism. In the GDO subroutine, microcontroller program first determines whether GDO switch 127 was closed momentarily. Momentary closure is determined by comparing the switch closure period to a fixed time period, which for example could be two seconds. If the switch was closed momentarily as determined by block 260, the microcontroller program will next read the channel selector switch input terminal 1020 connected to channel switch 136, which in the mirror embodiment illustrated in FIG. 3, could be provided by a 3-position slide switch located on the back of the mirror (see 43 in FIG. 3). The channel selector switch will be positioned to indicate channel 1, channel 2, or channel 3, is selected, each channel representing a different control signal. In this manner, the garage door opener may generate as many as three different garage door mechanism control signals. Having determined in block 261 which channel is selected, the GDO bit stream corresponding to the respective channel selected by switch 136 (FIG. 9b) will be read into the microcontroller from NVM 115. The GDO bit stream is a control signal made up of eight to sixteen bits which is transmitted repeatedly within the control signal to uniquely identify the receiver which is to be controlled thereby. The microcontroller determines the eight to sixteen bits to be transmitted by sampling the RF input when the microcontroller program and the transceiver 50 are being trained to the remote transmitter signal B generated by remote transmitter 40, as described below. The microcontroller will then place transceiver 50 in its transmit mode by providing the appropriate logic level on output 1022 as indicated by block 263. In block 264, the appropriate oscillator frequency will be output by V.C.O. 54, the repeating GDO bit stream will be modulated onto the output of V.C.O. 54 by switch 61, and the transmission will be acknowledged by an appropriate indication on display 131. After transmitting a remote control signal, the microcontroller provides an appropriate logic signal on output terminal 1022 to return transceiver 50 to the receive mode as indicated in block 265. In block 266, the garage door opener returns to the. SWCHK subroutine at block 231 (FIG. 11b) to return to the main program.

If the microcontroller 100 determines that switch 127 was closed more than momentarily by the test of block 260, it will proceed to the test of block 267 wherein it will determine whether switch 127 has been closed for more that 5 seconds. If switch 127 has not been closed for 5 seconds, the program returns to the SWCHK subroutine as shown by block 266. If the switch has been pressed for 5 or more seconds, the program proceeds to the test of block 268 via port 3A. In block 268, the microcontroller determines which channel is selected by the 3-position slide switch 136.

The microcontroller program then proceeds to block 269 wherein the frequency output by V.C.O. 54 is set to its lowest frequency, which, for example, can be 290 MHz. In block 270, the program determines whether radio frequency data is present at data input terminal 1023 of the microcontroller. If data is present at the data input, as indicated by a low logic level on input terminal 1023, the microcontroller program proceeds to the test of block 271 wherein it determines if input terminal 1023 is at its minimum. The amplitude minimum will occur when the output of the voltage controlled oscillator 54 is at the same frequency, or substantially the same frequency, as the signal output from low noise amplifier 60, thus eliminating any DC component from the oscillating signal. The amplitude minimum may be found by converting the output of demodulator 64 from analog to digital using an A/D converter if one is already present in the system and not fully utilized. The amplitude minimum may also be determined by moving the frequency supplied by V.C.O. 54 up or down by 500 KHz to see if the logic level at input terminal 1023 changes. The later method is preferred where an A/D converter is not available as the circuitry required to shift the frequency is already present in RF transceiver 50 and microcontroller 100. If the amplitude is not at its minimum as determined by the test of block 271, the microprocessor proceeds to increment the frequency as indicated by block 272. If radio frequency data is not present at data input terminal 1023, as determined by block 270, the program proceeds to block 272. In block 272, the frequency supplied by V.C.O. 64 is increased by 1 MHz by changing the control byte at output terminal 1021 of microcontroller 100. In block 273, the program determines if the frequency that results from adding 1 MHz to the previously output frequency results in the highest frequency V.C.O 54 will generate being output therefrom, for example 415 MHz. If the frequency output by V.C.O. 54 is not the highest frequency, the microcontroller program returns to block 270. If the frequency output by the V.C.O. is determined to be its highest value by block 273, the microcontroller will acknowledge an unsuccessful train sequence by providing an appropriate output indication to the display. The vehicle operator will thus be aware that microcontroller 100 has not trained to the signal of remote transmitter 40 (FIG. 2). Thereupon, the microcontroller program will return to the SWCHK subroutine.

If the microcontroller program determines at block 271 that the amplitude at input terminal 1023 is at its minimum, the microcontroller stores the control byte supplied on bus 68 to controllable divider 58 (FIG. 9a) in the nonvolatile memory 115 at a location associated with the selected channel on slide switch 136, as indicated by block 276. This control byte represents the carrier frequency of the control signal generated by remote transmitter 40a.

As indicated by block 277, microprocessor 100 next samples the RF input terminal 1023 to determine logic level transitions and detects thereby eight data bits. The control signal transmitted by remote transmitter 40 will have eight to sixteen bits which are modulated on the carrier signal and repeated periodically. The program must determine which bits are repeating, and store these repeating bits, to transmit a control signal which will be effective to activate mechanism 40. The sampled bits thus represent eight bits transmitted by remote transmitter 40a. As indicated by block 278, the sampled data bits are stored in a memory within microcontroller 100. The microcontroller program then proceeds through port 4A to block 279 wherein the RF input terminal 1023 is again sampled to determine the logic level transitions, and the next eight bits which are represented thereby. At block 280, the microcontroller program determines whether the first stored input bit stream representing equals the second input bit stream. If the first and second input bit streams are not equal, the microcontroller will store the second input bit stream in the microcontroller memory as the first input bit stream, and return to block 279, wherein the next input bit stream will be sampled as the second input bit stream. The microcontroller program will compare sequential bit streams of eight bits, then sequential bit streams of nine bits, then sequential bit streams of ten bits, etc., until the program finds two consecutive bits streams that are equal in the test of block 280. The program will then store the bit stream which it samples in two consecutive samplings in a nonvolatile memory location associated with the selected channel (on switch 136) as indicated in block 282. Because the number of bits which are repeated in a control signal differs among remote transmitters, sequential bit streams must be sampled and compared to determine the number of bits which are repeated by a particular remote transmitter 40a. Also, redundant detection helps insure that the microcontroller program correctly detects the repeating control bits which are modulated on the carrier signal by testing for repetition of a bit stream which is sampled.

In block 283, the microcontroller program will acknowledge a successful train on display 135. In block 284 the control signal which has been stored will be transmitted by the microcontroller and transceiver 50. The microcontroller will then return to the SWCHK subroutine, and then to the main program through port V.

Figure 13A:
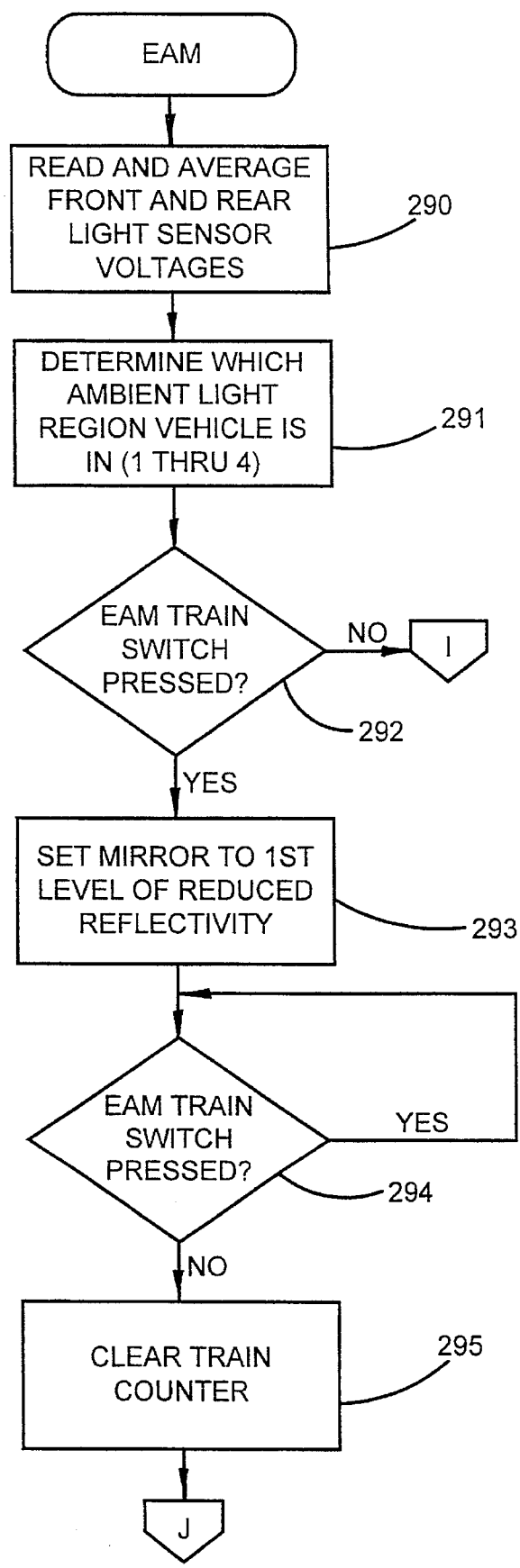
FIGS. 13a, 13b, and 13c is a flow diagram for another program subroutine shown in FIG. 11b.
Figure 13B:
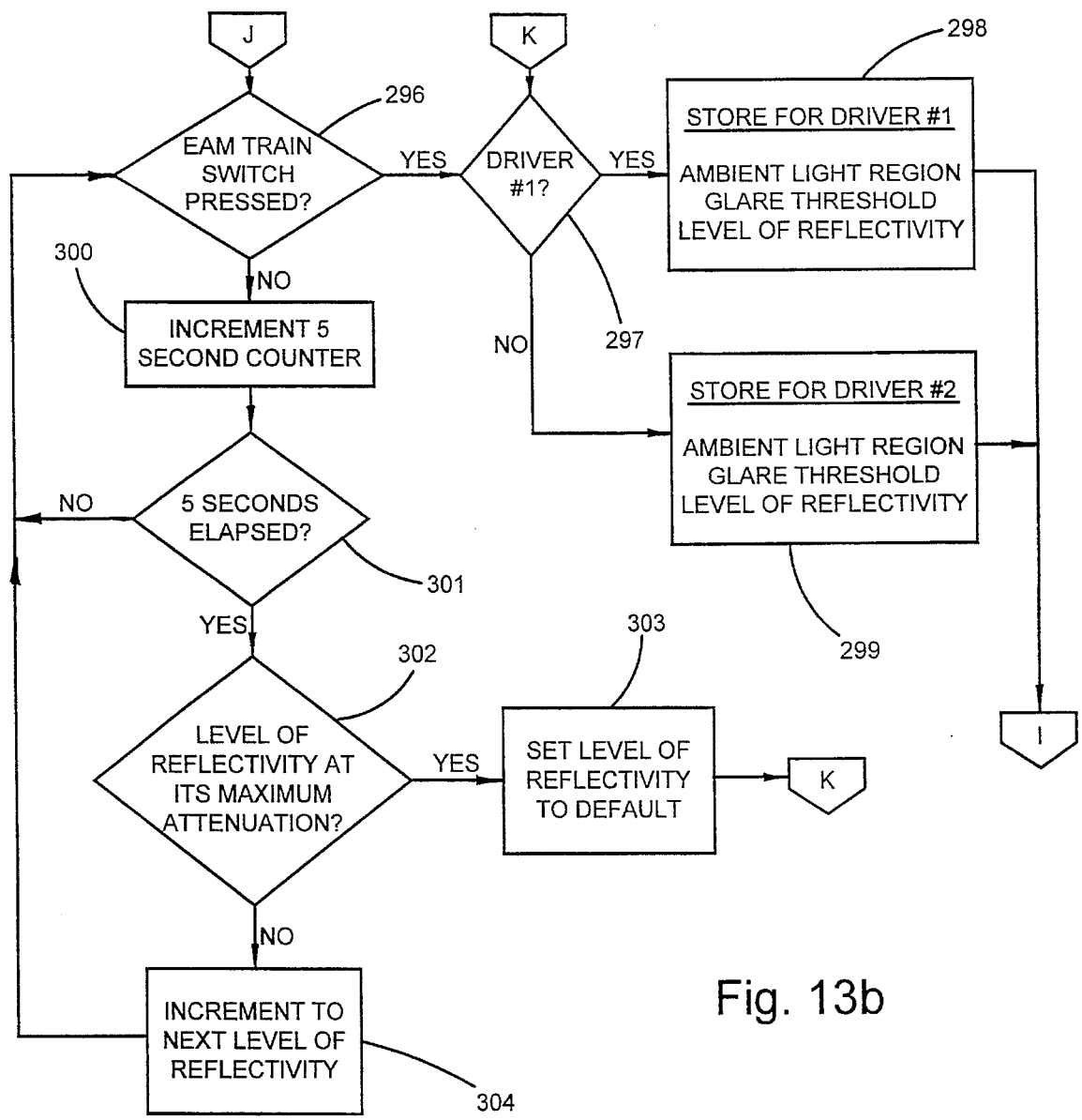
Figure 13C:
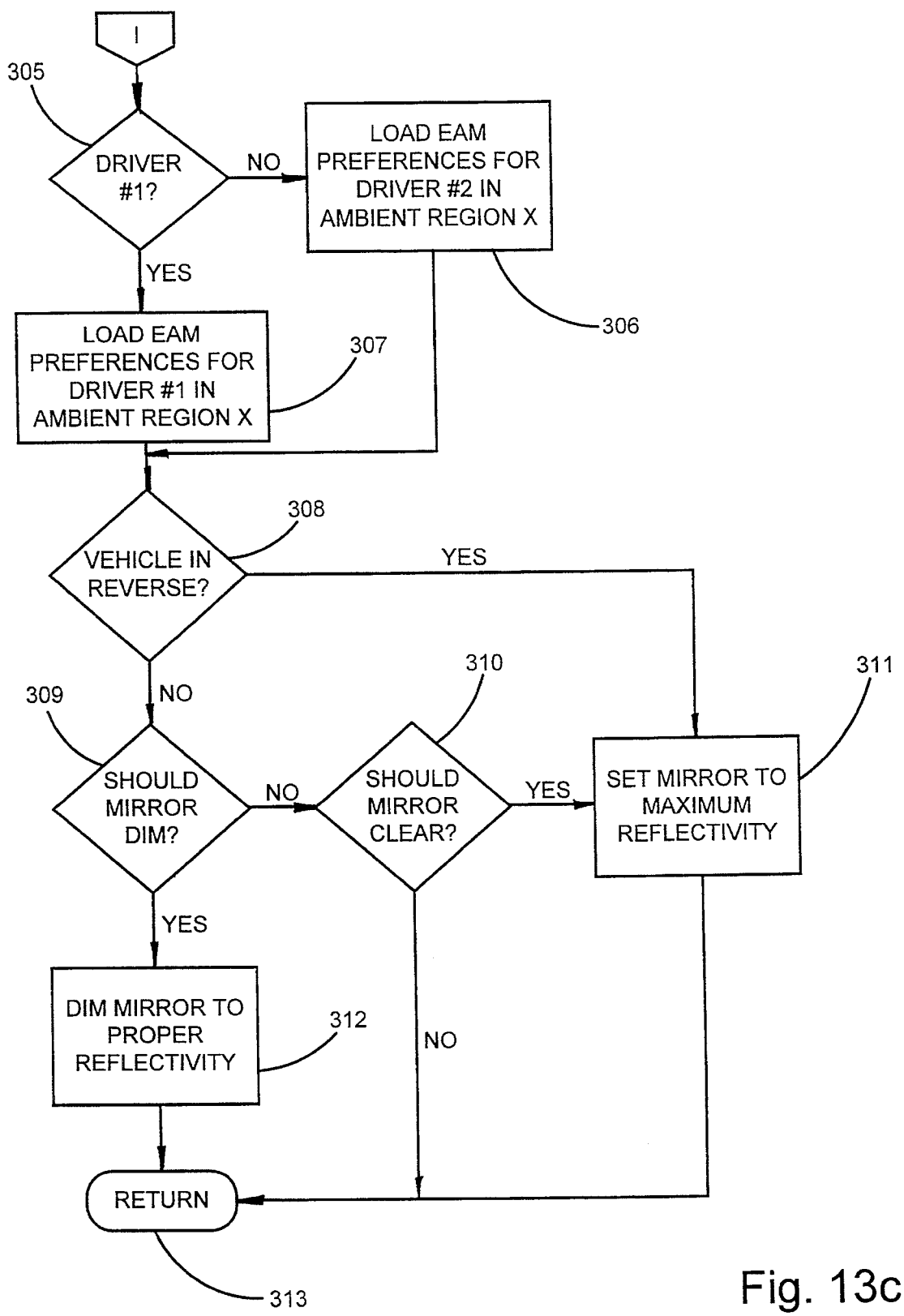

The subroutine for setting the electrically adjustable mirror is the EAM routine set forth in FIGS. 13a, 13b, and 13c. The microcontroller will first read inputs from photocells 108 and 111 via the front photocell and rear photocell input terminals 1010 and 1011 as indicated by block 290. The average level received at each of these inputs will be computed as indicated by block 290. In block 291 the microcontroller program will determine which of four ambient light regions the vehicle is in according to the averaged levels. These are preset regions which are determined from the average levels of the front and rear photocells; for example, the average of the front and rear averages could be used. Of course, more than four ambient light regions may by provided. The microcontroller will preferably use the average level on input terminals 1010 and 1011 so that the mirror will not respond to brief changes in the light received by the front and rear photocells 108 and 111. Accordingly, the average levels of inputs 1010 and 1011 should not change significantly until a light change is sensed by photocell 108 or photocell 111 for 5 to 15 seconds.

In the test of block 292, input terminal 1015 will be read to determine if EAM train switch 124 (See FIG. 9b) is closed. If switch 124 is open, the program will proceed through port I to the test of block 305 described below. If EAM train switch 124 is closed, the program of microcontroller 100 will place a control signal on output terminal 1018 which will set the mirror to the first level of reduced reflectivity, as indicated by block 293. The microcontroller program will again determine whether or not the EAM train switch 124 is open as indicated by block 294. The program will remain at this position in the subroutine until the user releases switch 124. Upon the EAM train switch being released, the microcontroller program will clear an internal train counter as indicated by block 295. The program then proceeds via port J (FIGS. 13a & 13b) to the test of block 296, where input terminal 1018 will again be read to determine whether EAM train switch 124 is closed. A second EAM train switch closure, as determined by test 296, indicates the vehicle operator wants the mirror to be trained to the current parameters, that is, the ambient light region determined by the information read as indicated by block 291, the glare threshold at the time the EAM switch was closed the first time, and the level of reflectivity at which the mirror is currently set.

Microcontroller 100 will accordingly determine whether the driver one is operating the vehicle, as indicated by the test of block 297. The microcontroller may also and preferably determine the identity of the driver from the identification code transmitted by the keyless entry key fob last used to access the vehicle. Another method of determining the identity of the driver is to provide a switch which corresponds to each driver. If driver one is operating the vehicle, the program of microcontroller 100 will store in NVM 115, at a location which corresponds to driver one, the ambient light region determined in block 291, the current glare tolerance, and the current reflectivity level.

Each ambient light region has an associated glare tolerance and reflectivity. These parameters are preset at default values which are stored in nonvolatile memory 115 until a vehicle operator sets their own preferred parameters. A glare level will be determined by subtracting the average level of input terminal 1011 from the average level of input terminal 1010. The glare threshold is the difference between the front and rear ambient light levels which indicates to the microprocessor that the mirror reflectivity should be adjusted. The setting of the glare threshold should be made according to the difference between the actual signal levels supplied by the front and rear photocells 108 and 111 when EAM switch 124 is closed by the operator, which is detected by the microcontroller program as indicated by block 292. The difference between the actual signal levels supplied by the front and rear photocells when switch 124 is closed by the operator to initiate training represents the actual threshold at which the driver experiences discomfort, and accordingly represents the point at which the driver wants the reflectivity of the mirror adjusted. However, the average levels of the signals supplied from photocells 108 and 111, averaged over a period of 5 to 10 seconds, should be used to determine the glare level for purposes of causing automatic adjustment of the mirror, as brief changes in the light received at the front photocell should not cause the reflective level of the mirror to change.

Referring to FIG. 13b, if the program determines in block 297 that driver one is not operating the vehicle, it will store the ambient light region which was determined in block 291, the glare threshold to be associated with that ambient light region, and the reflectivity level to be associated with that ambient light region, in NVM 115 at a location allocated for driver two. The parameters stored in NVM 115 will be used by the microcontroller to set the reflectivity level of EAM 135 according to the identity of the driver. The identity of the driver one will be used by the program as long as the last valid identification code received from a keyless entry key fob was the identification code stored in NVM 115 for driver one. Similarly, the microcontroller will operate using the identity of driver two if driver two's identification code was last valid identification code received from a keyless entry key fob. Following storage of the vehicle operator's parameters, microcontroller 100 will proceed to block 305 as described below.

If the microcontroller program determined EAM train switch 124 (FIG. 9b) was not closed, in block 296, it will increment the five second train counter, which was cleared in block 295, as indicated in block 300. At block 300, the program will determine if five seconds have elapsed as indicated by the train counter. If not, the microcontroller program will again determine if EAM train switch 124 is closed. If the EAM train switch 124 is not closed before the five second counter times out, as determined in block 301, the program will determine whether or not the level of reflectivity of the electronically adjustable mirror is set to its maximum attenuation. If the reflectivity of the mirror is at its maximum, the level of reflectivity will be set to the default level preset at the factory, as indicated by block 303, and the program will proceed through port K. The mirror may for example have four levels of reflectivity, which levels will be used for each of the ambient light regions. However, more or less than four levels of reflectivity may be provided. If the level of reflectivity is not at its maximum attenuation, the microcontroller program will increase the reflectivity attenuation as indicated by block 304, and return to the test of block 296 to determine whether or not the driver has closed the EAM train switch. If switch 124 is closed before the maximum reflectivity level is reached, the level of reflectivity on EAM 135 when the switch is closed (at block 296) will be stored as the current level of reflectivity parameter in block 298 or 299, and the program proceeds via port I to determine whether driver one is operating the vehicle by the test of block 305 (FIG. 13c). If driver one is not determined to be controlling the vehicle, the EAM parameters for driver two associated with the ambient light region determined in block 291 will be retrieved by microcontroller 100 from NVM 115, as indicated by block 306. If it is determined in block 305 that driver one is operating the vehicle, then the electronic adjustable mirror parameters for driver one associated with the ambient light region determined by block 291 will be retrieved from NVM 115.

The program then tests to determine whether the vehicle is in forward or reverse by polling input terminal 1004 as indicated by the test of block 308. If the vehicle is in reverse, electronically adjustable mirror 135 will be set to its maximum reflectivity. If the vehicle is not in reverse, the microcontroller program determines whether the mirror should be dimmed by the test of block 309. This is determined according to the parameters retrieved in block 306 or 307, and the average ambient light levels sensed by photocells 108 and 111. If the mirror should not be dimmed, as determined by block 309, the program will determine whether the mirror should be cleared, for example, because the ambient light level is decreasing. If the mirror should be cleared, the mirror will be set to the maximum level of reflectivity as indicated by block 311, and the subroutine program will return to the SWCHK subroutine. If the mirror should not be cleared, as determined by block 310, the microcontroller will also return to the SWCHK subroutine, and then to the main program through port V. If the microcontroller program determines as indicated by the test of block 309 that the mirror should be dimmed because the retrieved glare tolerance threshold has been exceeded, microcontroller 100 will dim mirror 135 to the retrieved level of reflectivity, as indicated by block 312, and then return to the SWCHK subroutine as indicated by block 313.

Figure 14A:
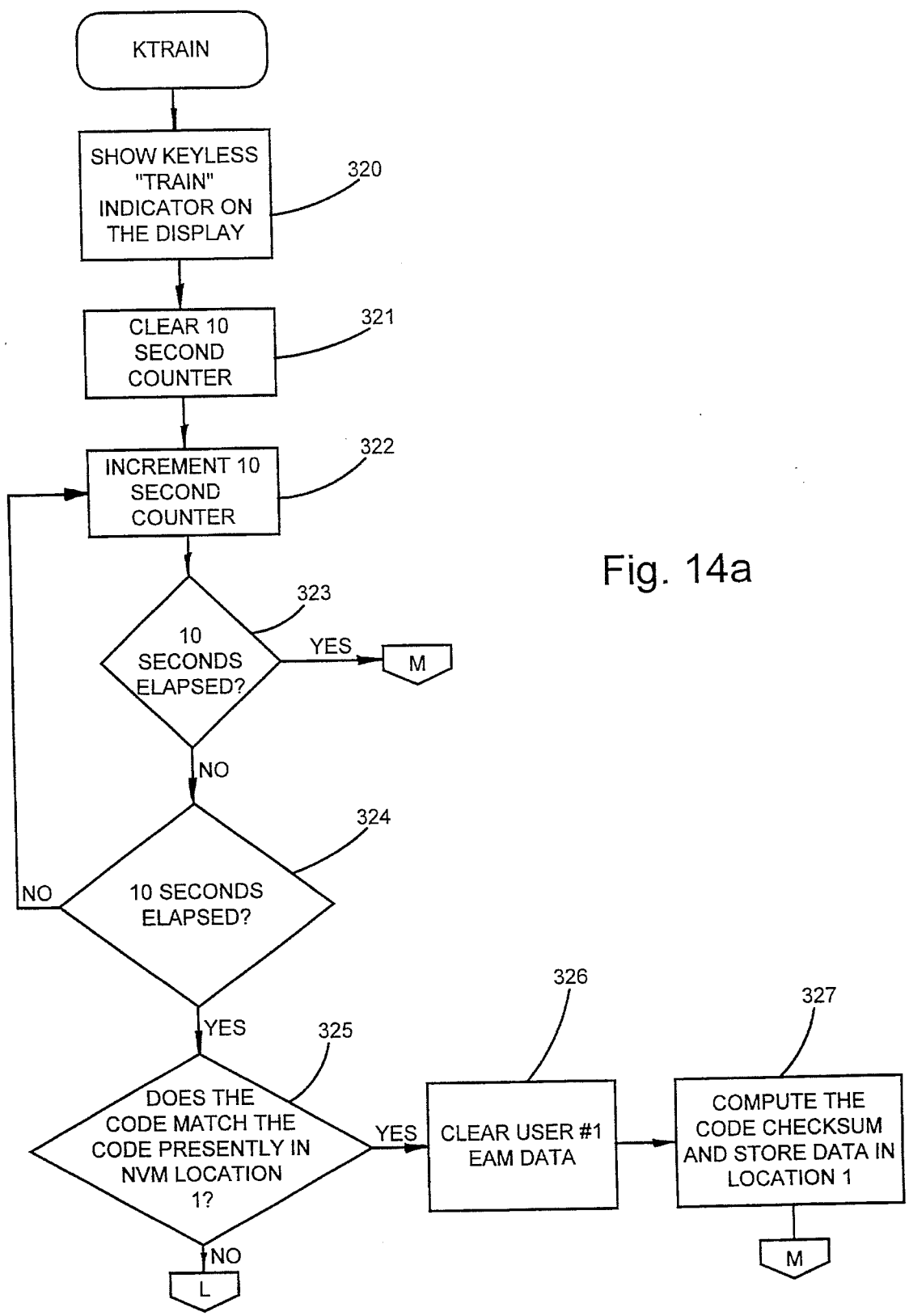
FIGS. 14a and 14b is a flow diagram for a program subroutine shown in FIG. 11c.
Figure 14B:
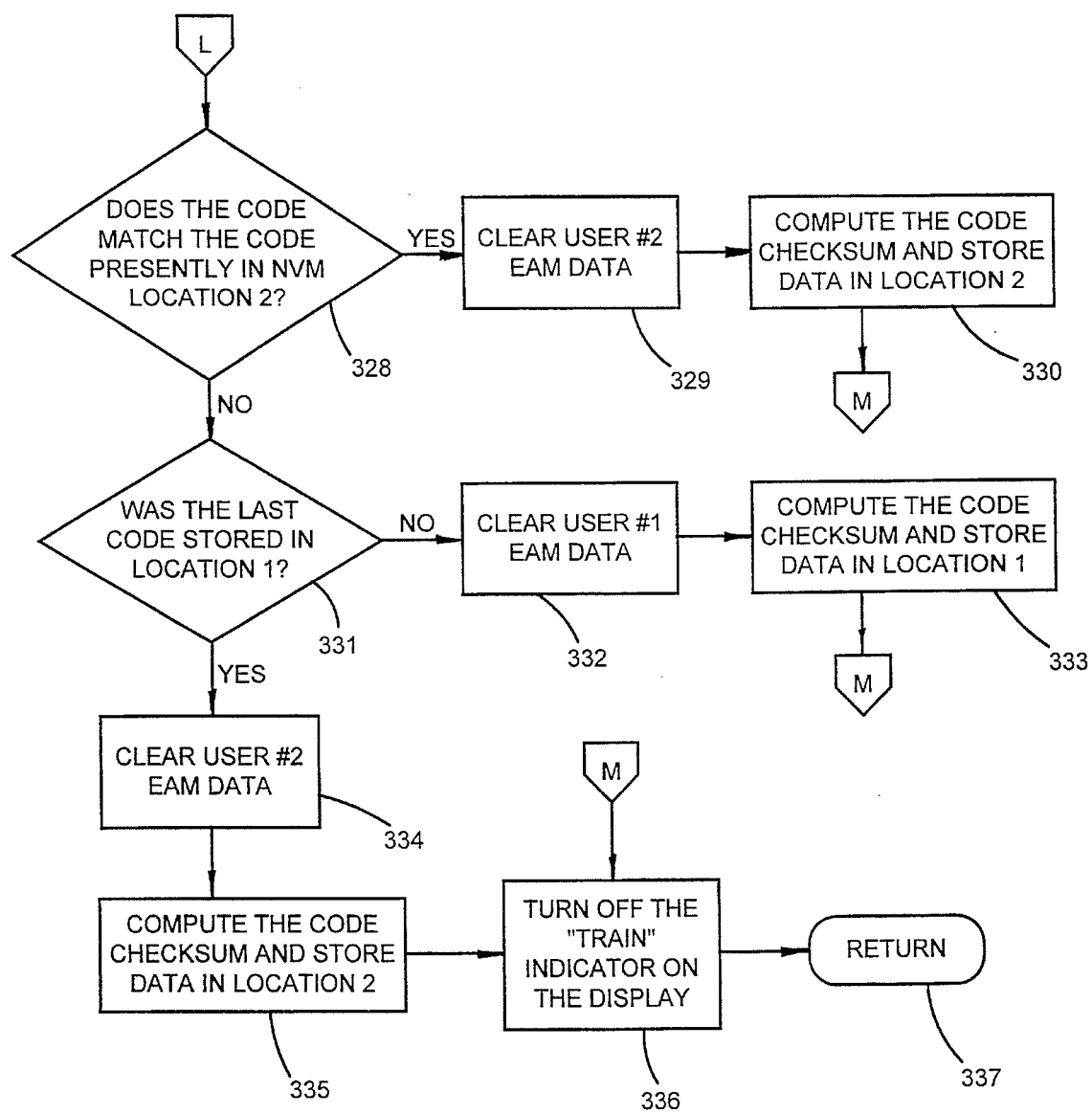

The keyless entry train routine, KTRAIN, is set forth in FIGS. 14a and 14b. This subroutine will be entered whenever both the EAM train switch 124 and the GDO switch 127 are closed simultaneously, as determined in the switch check (SWCHK) subroutine. A separate "RKE" switch could, however, be provided for initiating a remote keyless entry retrain. Microcontroller 100 controls display 131 to output a "train" indication as indicated by block 320. Following a train indication, a 10 second counter is cleared as shown by block 321. The 10 second counter is then incremented as indicated by block 322. The microcontroller program then determines whether 10 seconds has elapsed as indicated by block 323. If it has, the program proceeds to the test of block 336 via port M (FIGS. 14a and 14b) as described below. Until the 10 seconds has elapsed, the microcontroller waits for a valid identification code. If a valid code is received before the ten second timer times out, the microcontroller will proceed to the test of block 325. In block 325, it is determined whether the received identification code matches the code presently stored in NVM 115 for driver one. If the received identification code matches the code stored in NVM 115 for driver one, the microcontroller clears the mirror parameters stored for that driver, computes the checksum, and stores the received code in the memory location allocated for driver one's identification code, as indicated in block 327. The checksum is the sum of the bits of the code which is used to check the data for accuracy. The program will then proceed to the operation of block 336 below through port M.

If the program for the microcontroller determines in block 325 that the received identification code does not match the code presently stored in NVM 115 for driver one, it will proceed through port L and determine whether the identification code matches the code presently stored in NVM 115 for driver two, as indicated in block 328. If the identification code received and the identification code currently stored for driver two match, the microcontroller proceeds to clear driver two's EAM parameters, as indicated in block 329. In block 330 the microcontroller then computes the checksum of the identification code, and stores the received identification code and checksum in the NVM location associated with driver two's identification code. The program for the microcontroller then proceeds to block 336 below.

If the received identification code does not match the code presently in nonvolatile memory location for driver two, as determined by the test of block 328, the program will determine where the last entered code was stored in block 331. If last stored identification code is currently in the memory location corresponding to driver two's identification code, the program will clear driver one's electronically adjustable mirror preferences, as indicated in block 332. In block 333, the microcontroller program will then compute the code checksum, and store the received identification code and checksum in the memory location allocated for driver one's code. If the last code stored was stored in the memory location allocated for driver one, the microcontroller will clear driver two's electronically adjustable mirror data in block 334, compute the code checksum, and store the received identification code and checksum in the memory location allocated for driver two's code, as indicated in block 335. In block 336, also, the microcontroller turns off the train indicator on display 138 and in block 337 it returns to the SWCHK subroutine of FIGS. 11a–11c. Thus, the EAM subroutine stores new identification codes and clears stored EAM parameters, and if the new code fails to match either stored code, the program stores the received identification code in the opposite location of the last stored code.

Figure 15A:
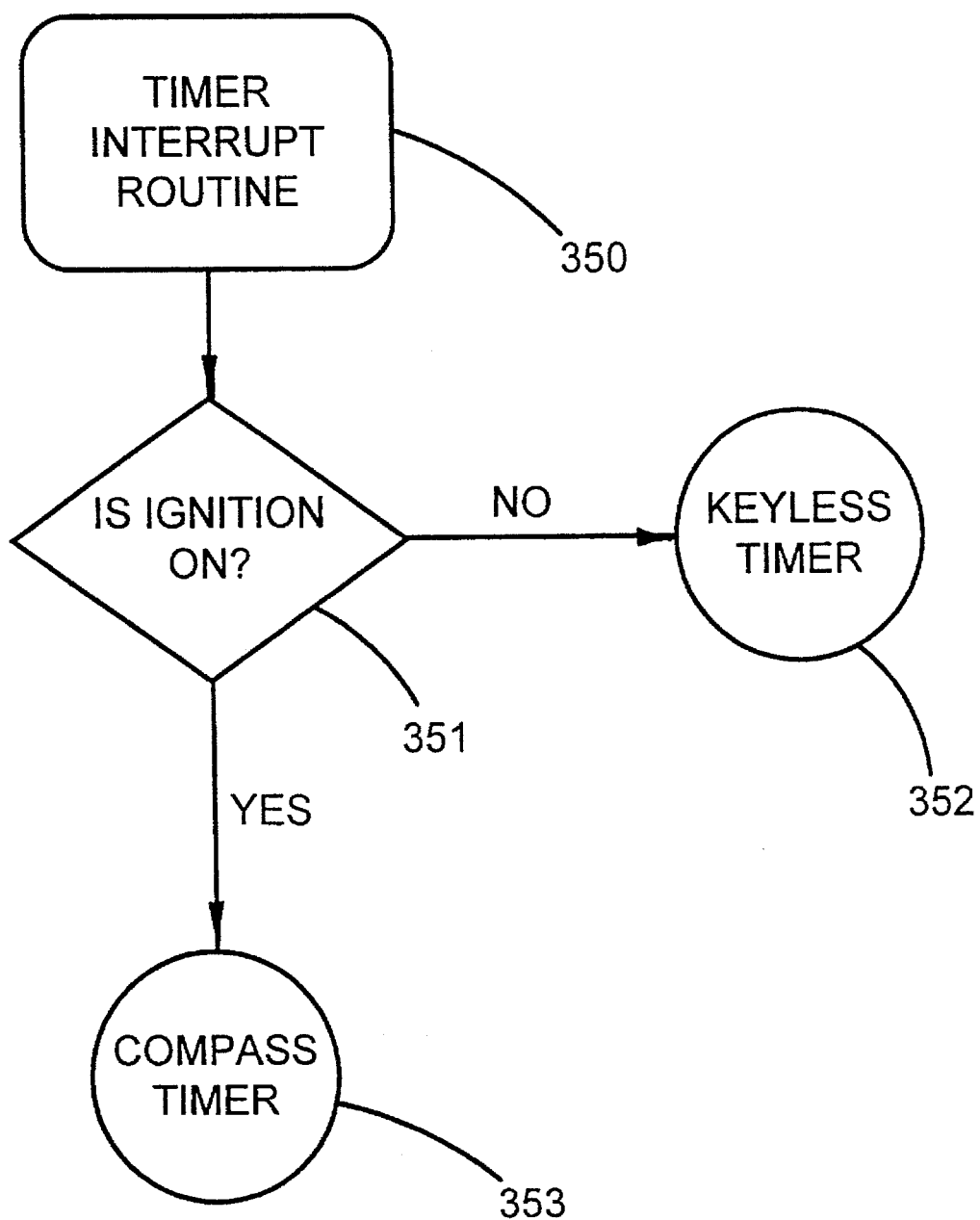
FIGS. 15a, 15b, 15c, and 15d is a flow diagram for an interrupt subroutine for use with the program of FIGS. 10–11c.
Figure 15B:
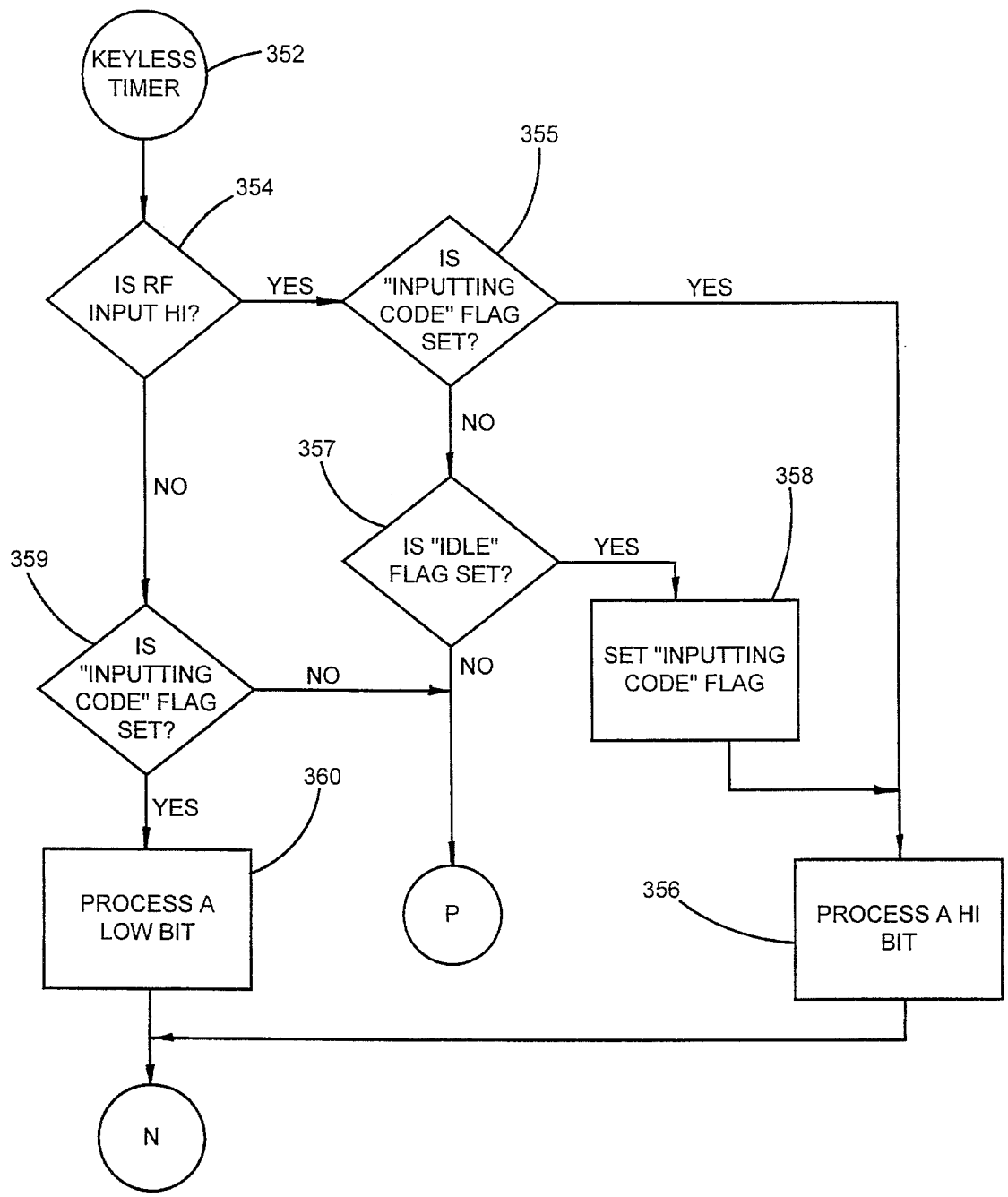
Figure 15C:
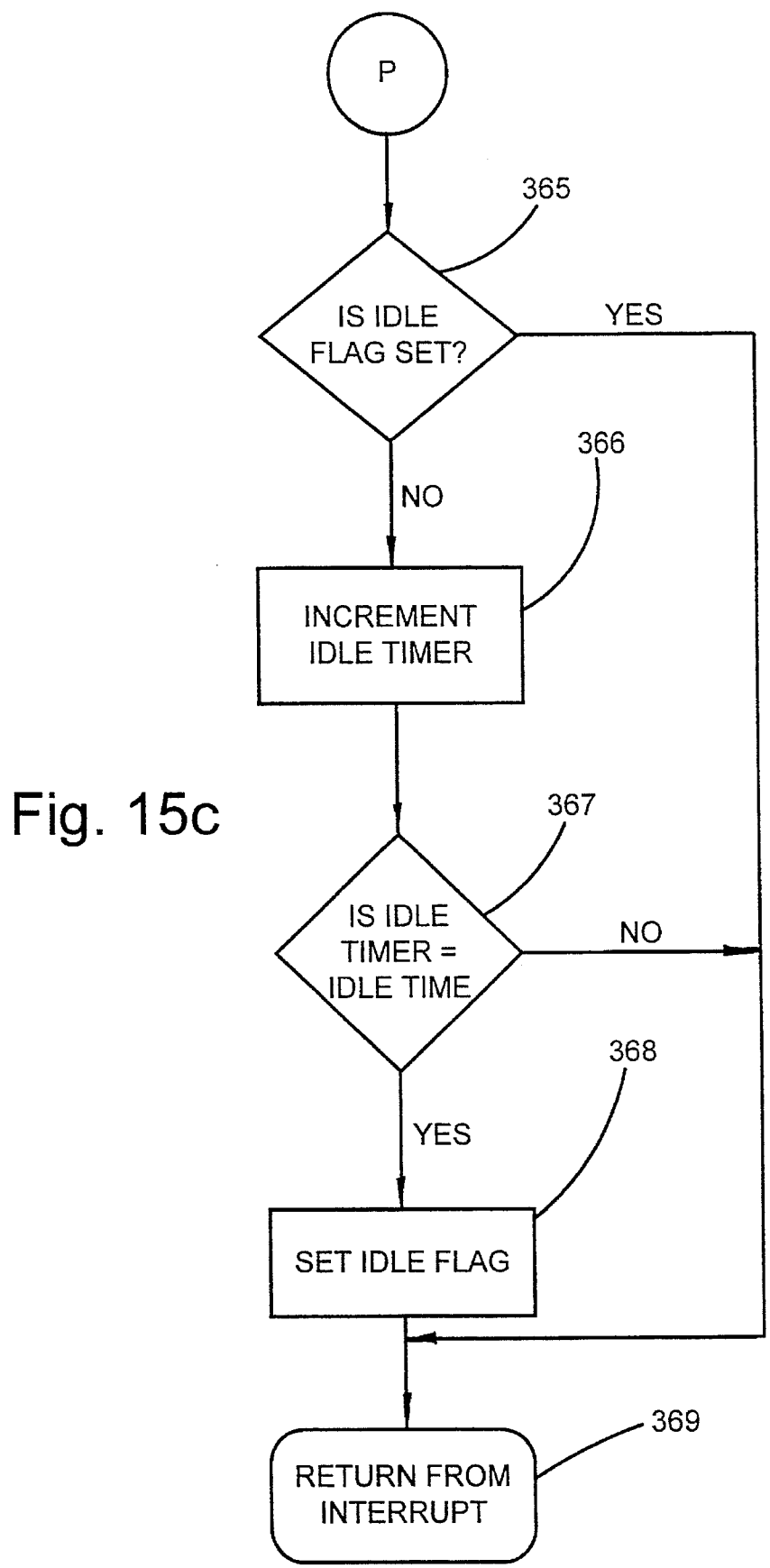

In order to interrupt the main program at regular intervals, a timer interrupt subroutine, diagrammed in FIG. 15a is provided. This interrupt routine interrupts the stop mode (FIG. 11c) at regular intervals to receive the identification code of the keyless entry signal or to update the compass reading. Upon interrupting the main program, the program first determines if the ignition is on as indicated by block 351. If the ignition is on, as determined by reading microcontroller input terminal 1002, the microcontroller program will proceed to the compass subroutine, which is preferably the subroutine disclosed in U.S. Pat. No. 4,546,551, issued Oct. 15, 1985, and entitled ELECTRICAL CONTROL SYSTEM, the disclosure of which is incorporated herein by reference. The microcontroller will also preferably provide compass calibration as disclosed in issued application 07/054,885, filed May 27, 1987, and entitled VEHICLE COMPASS WITH AUTOMATIC CONTINUOUS CALIBRATION, the disclosure of which is incorporated by reference. If the ignition is off, the keyless timer subroutine 352 of FIG. 15b will be executed.

In the keyless timer subroutine, the microcontroller program first determines in block 354 whether or not the radio frequency input terminal 1022 (FIG. 9b) to the microcontroller is at a high or low logic level. If a radio frequency input signal is received by RF circuit 50, a low logic level will be outputted by demodulator 64, which will cause the program to proceed to the test of block 355. In block 355, it will determine whether an internal "inputting code" flag has been set. The "inputting code" flag tells the microprocessor program that the identification code is being received at RF input terminal 1023 so that both high and low data bits will be sampled and processed until the entire identification code is received. Thus, if the inputting code flag is set, the microcontroller will process a high logic level to determine the pulse width thereof, as indicated in block 356. If the inputting code flag is not set, the program will determine in block 357 whether an internal "idle" flag is set. If the "idle" flag is set, the program proceeds to block 358 wherein the "inputting code" flag is set, and then the occurrence of a high logic level is processed to determine the pulse width thereof in block 356. If the microcontroller program determines in block 357 that the idle flag was not set, it will proceed to block 365 through port B. If microcontroller 100 determines in block 354 that radio frequency input terminal 1023 is low, it proceeds to block 359 wherein it determines whether the "inputting code" flag is set. If the "inputting code" flag is not set, the microcontroller program proceeds to block 365. If the microcontroller determines in block 359 that the "inputting code" flag is set, and thus the microcontroller is receiving a code, it will provide an internal indication that a low logic level is present as indicated in block 360, and thus the high logic level has ended, and proceed to block 371 via port N.

In block 365, microcontroller 100 determines whether the "idle flag" is set. If the "idle flag" is set, the microcontroller program returns from the interrupt to the main program as indicated in block 369. If the "idle flag" is not set, as determined in block 365, the idle time is incremented in block 366. The program next determines whether the idle timer is equal to a preset idle time as indicated by block 367. It determines the idle timer is not equal to the preset idle time, it returns from the interrupt as indicated by block 369. If the microcontroller program determines the idle timer equals the preset idle time, the "idle flag" is set as indicated by block 368 and the microcontroller returns from the interrupt, as indicated by block 369. The purpose of the idle timer is to insure that bits are ignored until a preset idle period, which is the period between identification code transmissions in the keyless entry signal, has elapsed.

Figure 15D:
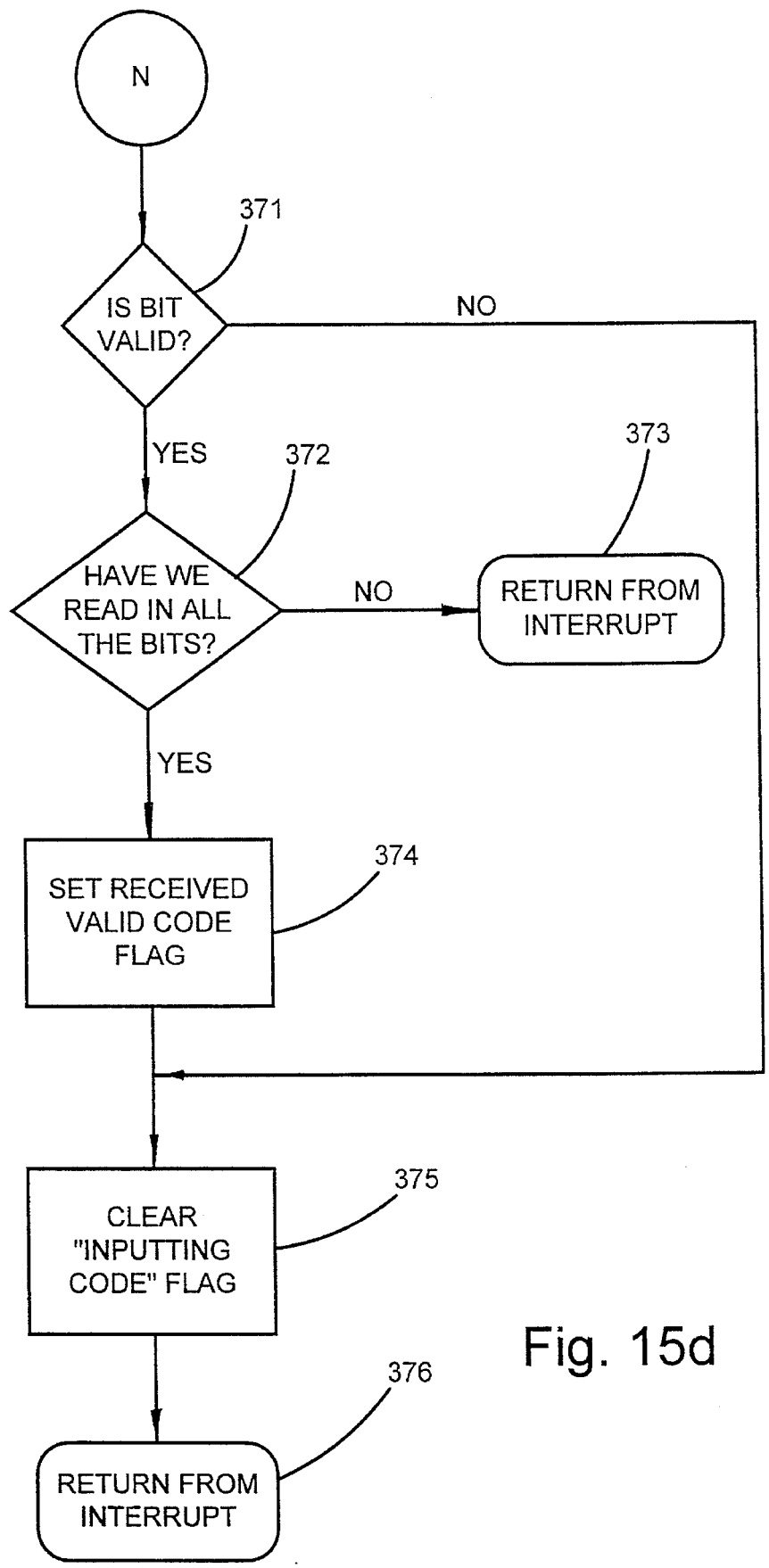

If the microcontroller and program processed high or low bits in blocks 356 or 360, respectively, then the program proceeds to block 371 of the TIMER INTERRUPT subroutine shown in FIG. 15d. The microcontroller program first determines whether the bit to be processed is valid in block 371. If it is an invalid bit then the microcontroller will clear the inputting code flag in block 375 and return from the interrupt. If the bit is valid, that is, it has the proper pulse width for either a zero or a one bit, as determined in block 371, the microcontroller will determine whether all of the bits have been read as indicated by block 372. If all the bits have not been read, that is, if the required number of bits in the identification code have not been received, the microcontroller program will return from the interrupt as indicated by block 373 to await the next bit. If the microcontroller program determines in block 372 that all the bits have been received, the microcontroller program will first set an internal flag, indicating a valid code has been received, as indicated by block 374, and then clear the "inputting code" flag as indicated by block 375. The microcontroller program will then return from the interrupt as indicated by block 376.

Figure 16:
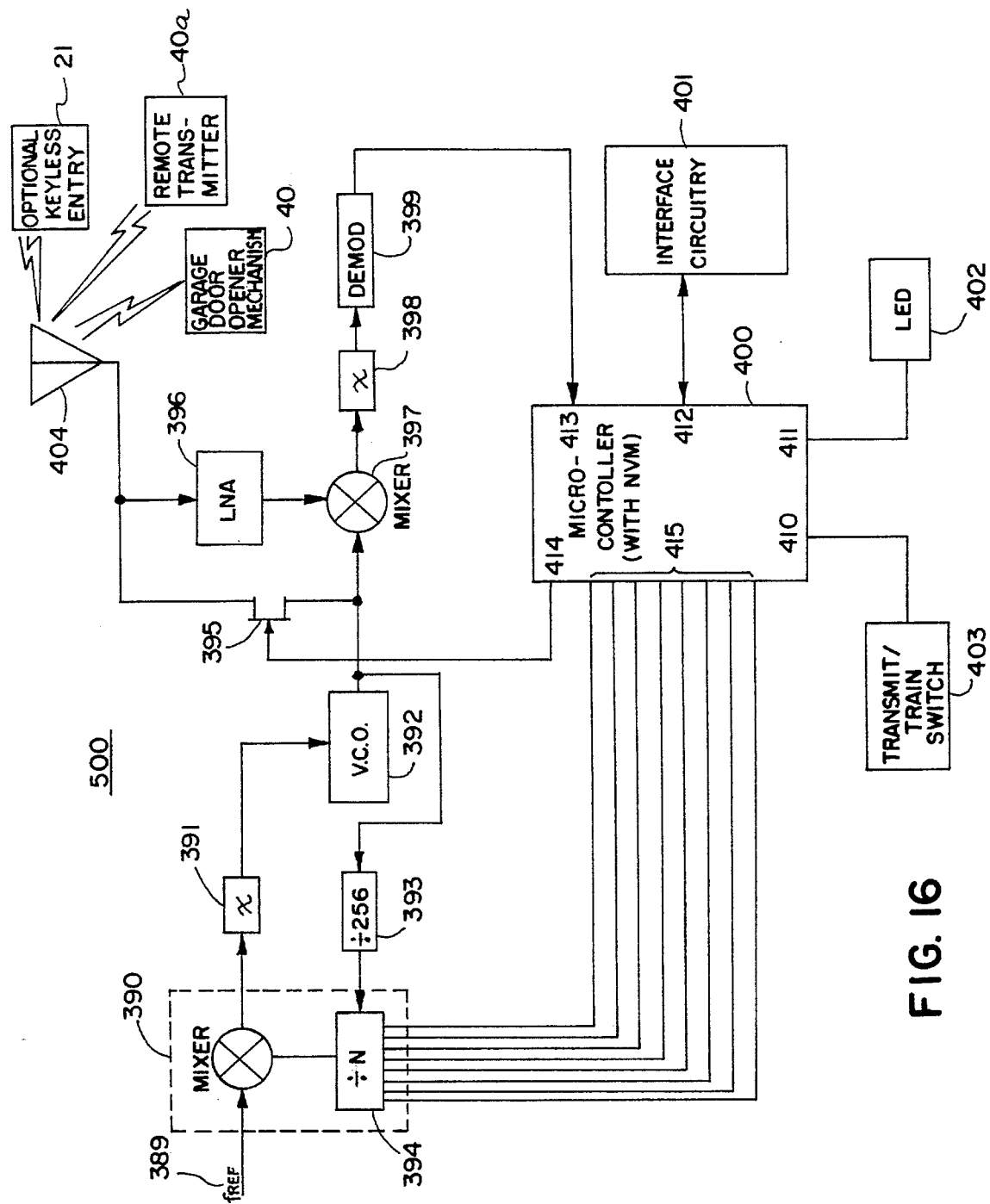
FIG. 16 is an electrical circuit block diagram of a trainable garage door opener.

FIG. 16 shows a trainable universal garage door opener block diagram which can be provided as a stand alone unit or integrated into the mirror package shown in FIGS. 1–8. This unit can be provided as an accessory which may be located within a structural accessory, such as a visor, a roof console, or a mirror. The unit operates in substantially the same manner as the RF transceiver 50 and microprocessor 100 of the circuit illustrated in FIGS. 9a and 9b, and its software described above and, accordingly, will only be briefly described below.

The unit illustrated in FIG. 16 includes a transceiver 500 which comprises a reference frequency source 389 which may be generated by, for example, a color burst oscillator for a T.V. operating at approximately 4 MHz. The reference frequency is combined in a mixer 390 with the control frequency provided by a programmable divider 394. The output of the mixer is filtered by a low pass filter 391 and is provided as a control input for a voltage control oscillator 392. The output signal of the voltage control oscillator is provided to a second mixer 397. The output signal of V.C.O 392 is also applied to divide-by-256 divider 393. The output signals of divider 393 are apparent to an input of a controlled divider 394, the output of which is coupled to the second input of mixer 390. Controllable divider 394 receives an eight bit control signal from the output terminals 415 of a microcontroller 400. The output signals of V.C.O. 392 are employed to actuate a garage door mechanism and are coupled through a F.E.T. switch 395 when microcontroller 400 provides a transmit enable signal at output terminal 414 to switch 395 which modulates the binary data supplied from output 414 of microcontroller 400 with the frequency output signals of V.C.O. 392.

Signals are received by an antenna 404 of transceiver 500 and amplified by a low noise amplifier 396 before being mixed in mixer 397. The low noise amplifier is optional, and would only be required if transceiver 500 is also used to receive keyless entry signals. The output of mixer 397 is filtered by a low pass filter 398 coupled to a demodulator 399 which demodulates the output of low pass filter 398 to provide binary signals which are applied to the RF input 413 of microcontroller 400. Microcontroller 400 may be commercially available 6805P1 or 6805J1 ICs, but any suitable microprocessor could be used. Additional control inputs and outputs may be received through input/output 412 from interface circuitry 401. For example, interface circuit 401 may include a channel selection switch which provides which one of a plurality of control signals is to be trained or transmitted. An LED output 402 connected to microcontroller output 411 provides an indication to the user that microcontroller 400 has trained or failed to train to a remote control signal, and that it is currently transmitting signals. A transmit train switch 403 coupled to microcontroller input 410 controls the microcontroller to either transmit a signal via transceiver 500 or to train to the control signal of a remote transmitter for actuating a garage door mechanism.

The operation of microcontroller 400 will now be described with respect to FIGS. 17a, 17b, 17c and 17d. The program for the operation of microcontroller 400 is substantially the same as that for microcontroller 100 as described above with respect to FIGS. 12a, 12b, and 12c, and accordingly, FIGS. 17a, 17b, 17c, and 17d are described only briefly below.

In block 450 the ports and registers of microcontroller 400 are initialized and the internal RAM is cleared. The internal RAM of the microcontroller will then receive programming code for its operation from a ROM which may be part of the microprocessor or external thereto. In block 451, the microcontroller program will turn the transceiver switch 395 to its receive mode by providing the appropriate logic level on output 414. As indicated in block 452, the microcontroller program will supply an 8-bit data byte to output 415 which will be supplied to controllable divider 394 and result in V.C.O. 392 generating a 315 MHz signal. The 315 MHz signal is provided as an example, and the output of the oscillator should be that of the carrier frequency of the keyless entry signal when the transceiver is in its idle reception mode. Of course, any appropriate RF frequency could be used for the keyless entry carrier signal, and the output of the V.C.O should correspond thereto. Furthermore, if transceiver 500 is not used to receive keyless entry signals, the V.C.O. need not generate the 315 MHz signal during an idle mode. As shown by block 453, the microcontroller program determines whether radio frequency data has been received. If RF data has been received at input 413, the microcontroller program will process the radio frequency data, as indicated in block 449. If radio frequency data has not been received, or after the input data has been processed, the microcontroller program will determine whether or not transmit switch 403 has been closed, as indicated in block 454. If transmit switch 403 is closed, the microcontroller program will determine as indicated by block 453 whether any radio frequency data has been received.

The microcontroller will process data at input 413, as indicated in block 449, when the microcontroller program determines RF data is present at the RF input 413, as indicated by block 453. Once microcontroller 400 determines switch 403 is open, the program will proceed through port 2B to block 455 where the microcontroller program will determine whether the switch has been closed momentarily, which for example could be a period of less than two seconds. If switch 403 has been pressed momentarily as determined in block 455, the microcontroller will retrieve the data stored in an internal or external NVM of microcontroller 400 at a location corresponding to the channel indicated by the channel selector switch in interface circuit 401, as indicated in block 456.

As indicated by block 457 the microcontroller program retrieves a garage door opening bit stream from the NVM location associated with the channel selected by the channel selector switch. The microcontroller program will place transmitter/receiver switch 395 in the transmit mode, as indicated in block 458. As indicated by block 459, the microcontroller program will transmit the retrieved control code, and acknowledge the transmission by turning on LED 402. The transmitter/receiver switch will be turned off as indicated by block 460 to place the transceiver in the receive mode, and the microcontroller program will proceed to block 453 shown in FIG. 17a. If the switch has not been pressed momentarily, as determined in block 455, the microcontroller will determine whether the switch has been pressed for longer than five seconds, as indicated in block 460. If switch 403 has not been closed for five seconds or more, the microcontroller program will return to block 453 in FIG. 17a.

If the switch has been pressed for at least five seconds, the microcontroller program will proceed through port 3B to determine, as indicated by block 462, which channel is selected by checking the channel selector switch. The microcontroller program will next set V.C.O. 392 to its lowest output frequency, for example 290 MHz. The microcontroller program then determines whether a demodulated radio frequency signal has been received at the data input to the microcontroller as indicated by block 464.

If radio frequency data has been received at input terminal 413, the microcontroller will determine whether data input terminal 413 is at its minimum, as indicated by the test of block 465. This may be done, as described above with respect to FIG. 12b, by converting the output of demodulator 399 to a digital value or by shifting the frequency of the V.C.O. by 500 KHz to determine if the logic level on input terminal 413 changes. If the RF data input level is not at the minimum, as determined in block 465, or if the RF data is not present at input terminal 413, as determined by the test indicated by block 464, the frequency output by V.C.O. 392 will be incremented by 1 MHz by changing the output on terminals 415, as indicated in block 467. If the frequency output by V.C.O. 392, as indicated by the control byte from terminal 415, is greater than the highest frequency to be generated, which for example may be 415 MHz, then microcontroller 400 will acknowledge an unsuccessful training sequence, as indicated in block 469, by, for example, flashing LED 402. The program will then return through port 1B to block 453. If the frequency output by V.C.O. 392 is not at the highest frequency, the microcontroller program will return to block 464 to repeat the tests of blocks 464 and 465, and operation of block 467, until either the V.C.O. reaches its highest output frequency as indicated by the control byte, or the RF data input 413 is at its amplitude minimum, as determined from the input terminal 413.

Figure 17A:
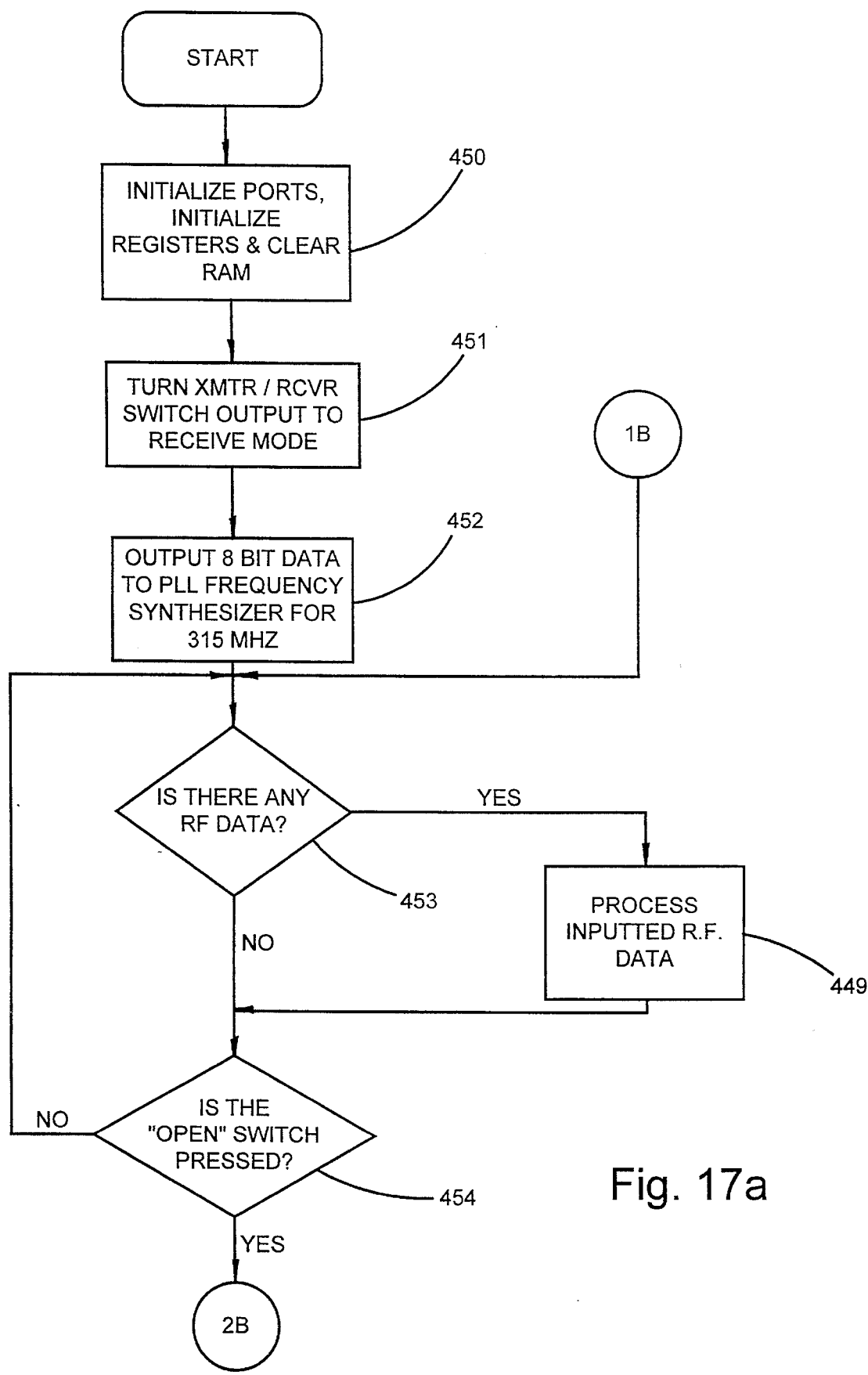
FIGS. 17a, 17b, 17c and 17d is a flow diagram for the microcontroller of a trainable garage door opener shown in FIG. 16.
Figure 17B:
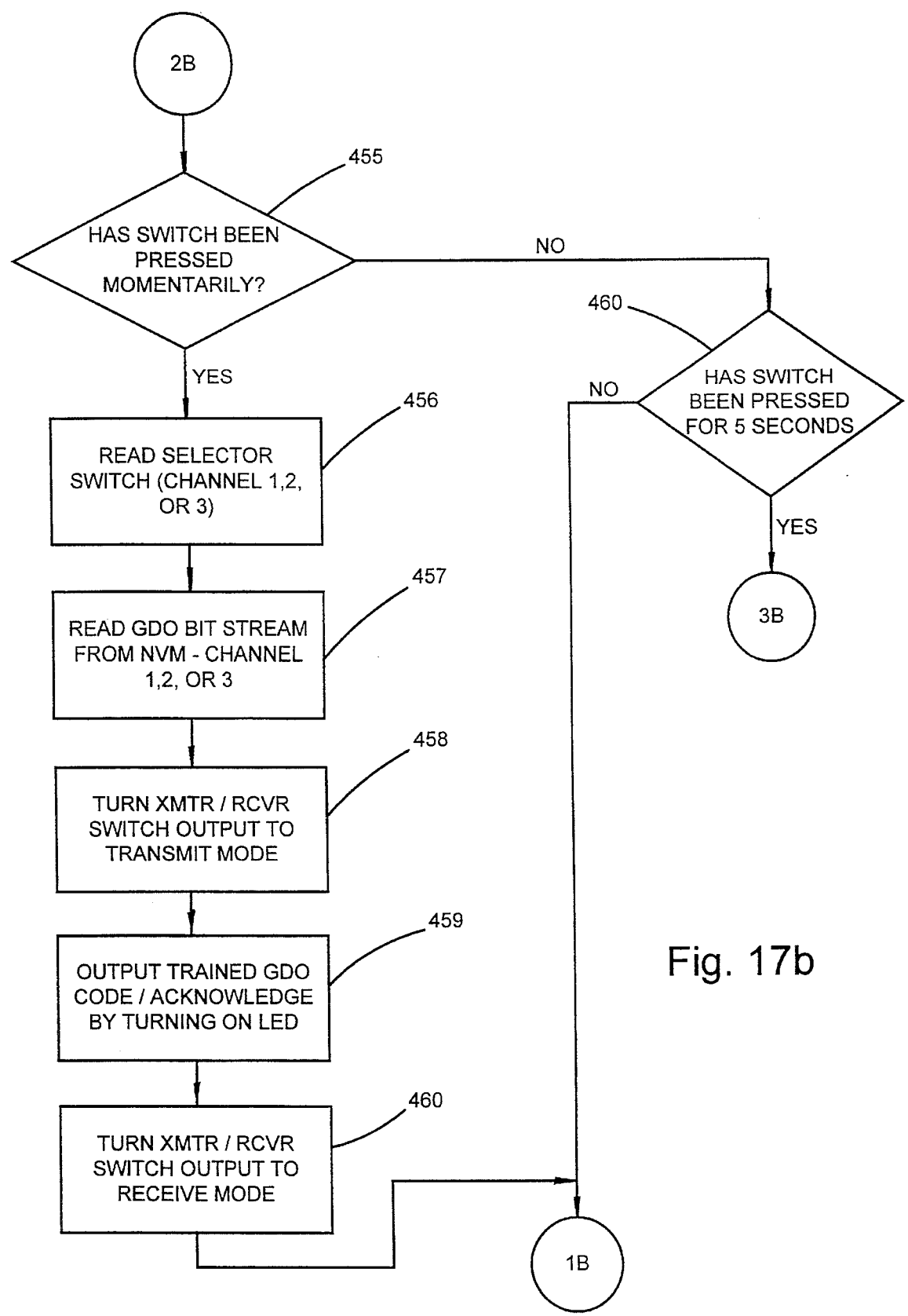
Figure 17C:
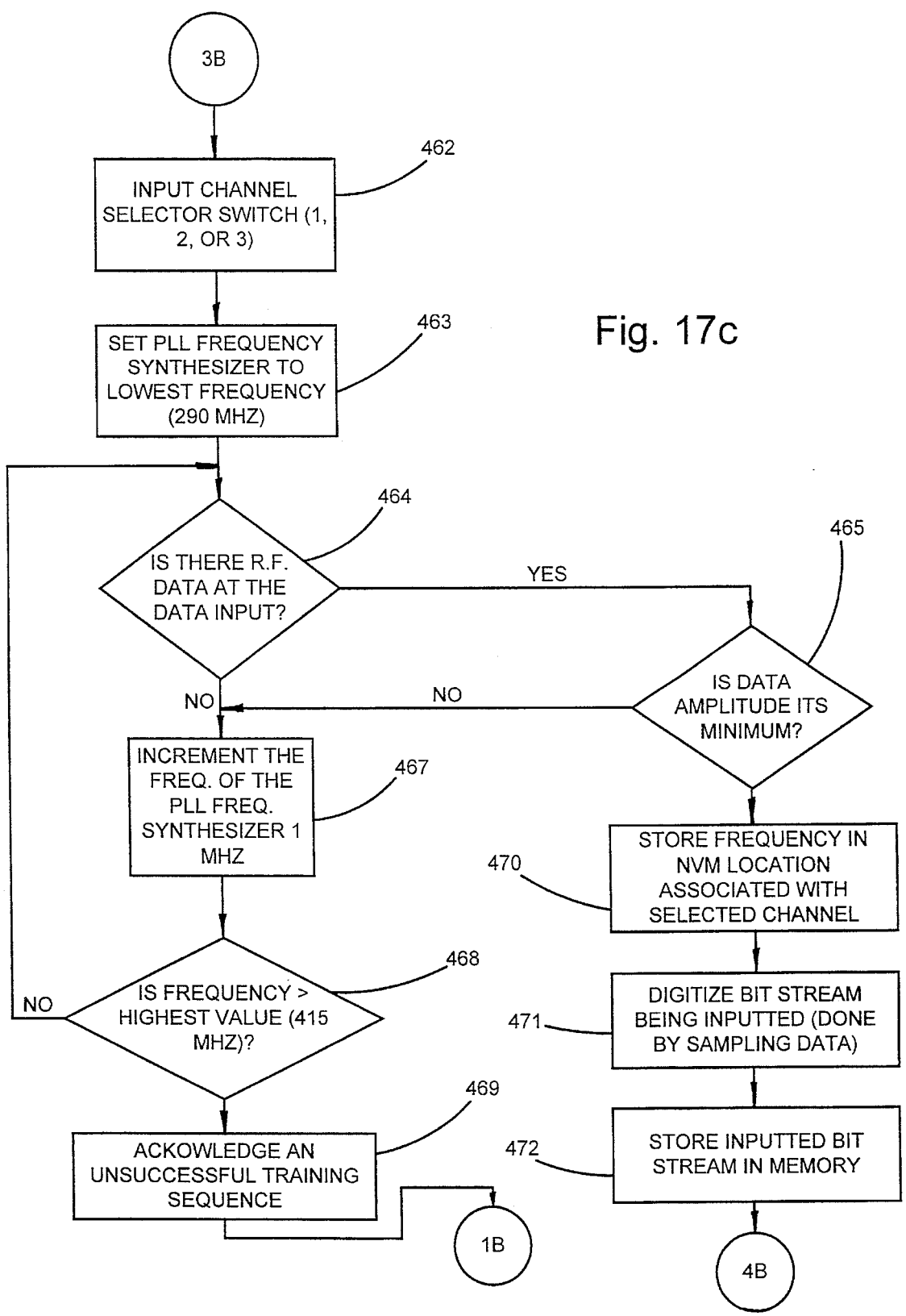
Figure 17D:
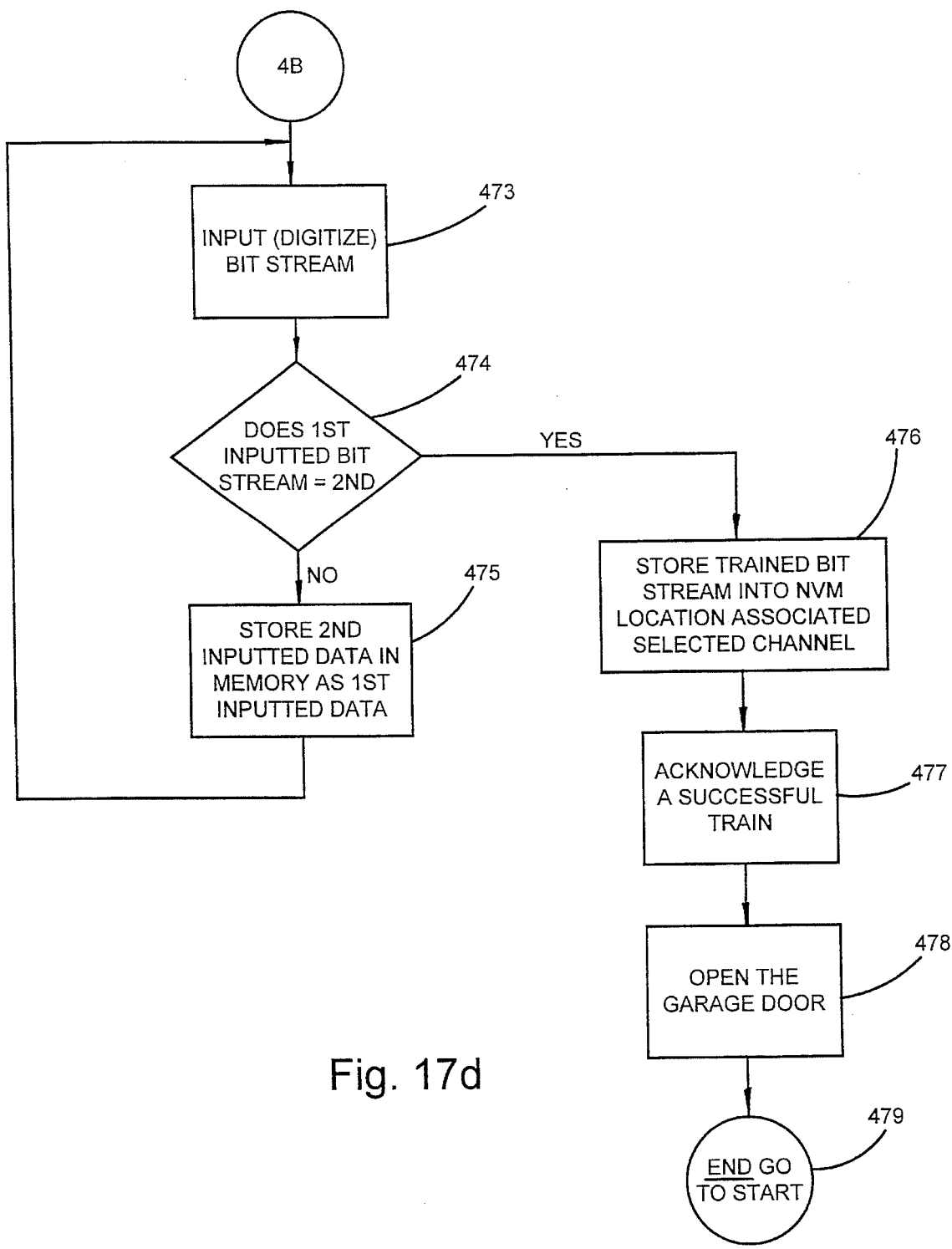

If the program for microcontroller 400 determines in block 465 that the RF input is at its minimum amplitude, the microcontroller stores the control byte provided on output 415 in the nonvolatile memory location associated with the selected channel, as indicated in block 470 (FIG. 17c). This byte represents the frequency output by the V.C.O. 392 which is substantially equal to the carrier frequency of remote control 40a (as shown in FIG. 2) for the garage door control mechanism 40. As indicated by block 471, after the carrier frequency has been determined and while the V.C.O. is outputting a signal equal to the carrier frequency of the remote control signal, RF input terminal 413 is sampled to input a digitized bit stream corresponding to the control bits modulated on the carrier frequency of the remote control signal transmitted by remote transmitter 40a. Next, as indicated by block 472, microcontroller 400 will store the sampled bit stream, and proceed through port 4B to block 473. The microcontroller program will sample a second digitized bit stream as indicated by block 473. The microcontroller program will then test to determine in block 474 whether the first stored bit stream equals the second stored bit stream. To detect the repeating bits in the bit stream, the program may, for example, sample the RF input terminal 1023 (FIG. 9b) to detect transitions between low and high logic levels. For example, the microcontroller program may sample the first sixteen transitions, and store eight corresponding bits. The microcontroller program may then sample the next sixteen transitions, to determine the next eight bits. If these eight bit sequences are not equal, the program would then sample the next eighteen transitions and store a corresponding nine bits. After sampling eight bit bit streams, the microcontroller would then sample the RF input terminal to determine the next eighteen transitions, thereby determining the next nine bits. The program would repeat this sampling until two consecutive bit sequences are identical. Thus if the first bit stream does not equal the second, the second input stream is stored in memory as the first input bit stream. The next sampled bit stream will then be inputted as the second input bit stream. The microcontroller will again test to determine whether the first input bit stream equals the second inputted bit stream in block 474. This cycle will continue until the first input bit stream and the second input bit stream are equal. When the first and second input bit streams are equal, the microcontroller program stores the repeating bit stream in a memory location associated with the selected channel as indicated by block 476. A successful train sequence is displayed to the user as indicated by block 477 and the microcontroller and transceiver 500 will then transmit the stored control signal to actuate the garage door garage door mechanism, as indicated by block 477. The microcontroller will then return to the beginning of the program at block 450 in FIG. 17a.

Thus it can be seen that the transceiver and the control circuit therefore (FIGS. 9a, 9b, and 16) generate a remote control signal for a garage door mechanism using circuitry provided as part of a structural accessory. Because the transceiver and the control circuitry therefore trains to the signal of a remote control using circuitry provided within the structural accessory, physical modification of the structural accessory is not required in order to generate a control signal which will be effective to actuate the control mechanism. It can also be seen that the transceiver 50 (FIG. 9a) and transceiver 500 (FIG. 10) receive both a keyless entry control signal and a remote control signal from transmitter 40 thereby eliminating circuit redundancy in providing both electrical accessories. The system can additionally include a control circuit for controlling an information display 135 (FIG. 9b) using the control circuit for the transceiver. Furthermore, a mirror with a degree of reflectivity set according to the parameters preferred by each driver of vehicle was seen which uses the transceiver control circuit. Thus a flexible and efficient system is set forth for providing vehicle options.

It will become apparent to those skilled in the art that various modifications to the preferred embodiment described and disclosed herein can be made, for example, the parameters stored for each driver of the vehicle may be retrieved by the microprocessor according to operator select switches provided in the vehicle or even on the rearview mirror assembly where a keyless entry is not provided with the EAM mirror. These and other modifications will, however, fall within the spirit or scope of the inventions as defined by the appended claims.

The embodiments of the invention in which an exclusive property or privilege is claimed are defined as follows:

1. A vehicle trainable transmitter for actuating a garage door mechanism, said trainable transmitter comprising:

means for receiving a first transmitted control signal having a radio frequency carrier signal from a remote control for a garage door mechanism, said first control signal having a carrier frequency and said receiving means outputting said first control signal;

circuit means coupled to said receiving means for inputting said first control signal, storing carrier frequency information and said circuit means for detecting control signal information and for storing detected control signal information;

means for generating and transmitting a second control signal from said frequency information and said control signal information stored in said circuit means, whereby said second control signal has the carrier frequency identified by said circuit means and the control signal information detected by said circuit means and said second control signal is selectively transmitted to actuate the garage door mechanism without the remote control; and means for generating reference signals having different frequencies, said reference signal generating means controlled by a frequency control signal, wherein said reference signal generating means outputs reference signals at different frequencies which are input to said circuit means, the frequency of said output reference signal being varied until said circuit means detects that the frequency of said reference signal and the frequency of said first control signal from said remote control are substantially equal.

2. A trainable transmitter as defined in claim 1 wherein said control signal information includes a binary code and said circuit detects the binary code in said first control signal of said remote control.

3. A trainable transmitter as defined in claim 2 wherein said transmitting means transmits said second control signal by controlling said signal generating means to generate a radio frequency carrier signal having the same frequency as said first control signal and transmitting said detected code using said radio frequency carrier signal.

\* \* \* \* \*

UNITED STATES PATENT AND TRADEMARK OFFICE
CERTIFICATE OF CORRECTION

PATENT NO. : 5,614,885
DATED : March 25, 1997
INVENTOR(S) : Paul S. Van Lente et al.

Page 1 of 4

It is certified that error appears in the above-identified patent and that said Letters Patent is hereby corrected as shown below:

Drawing Sheet 3;

Add --Fig. 4 to figure shown-- --.

Col. 3, Line 12;

"Fig. 5." should be --Fig. 5;--.

Col. 4, Line 46;

"(Fig. 9B)" should be --(Fig. 9b)--.

Figure 9B:
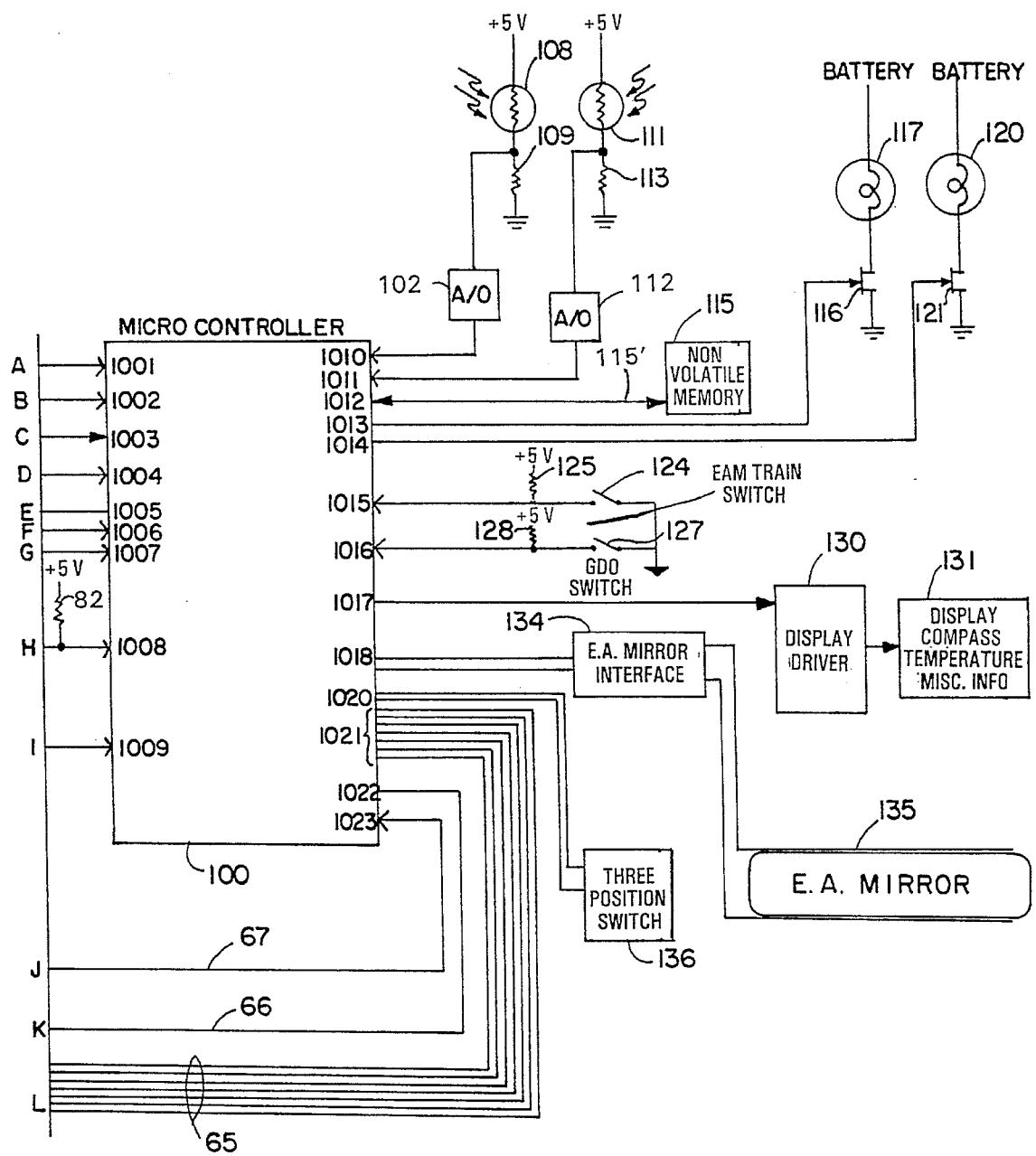

Col. 5, Line 21;

"Figs. 5A and 5B" should be --Figs. 9a and 9b--.

Col. 6, Line 24;

"Fig. 5A" should be --Fig. 5a--.

Col. 6, Line 29;

"3-5," should be --35,--.

Col. 6, Line 33;

"36 a" should be --36a--.

Col. 8, Line 12;

"pull up" should be --pull-up--.

UNITED STATES PATENT AND TRADEMARK OFFICE
CERTIFICATE OF CORRECTION

PATENT NO. : 5,614,885
DATED : March 25, 1997
INVENTOR(S) : Paul S. Van Lente et al.

Page 2 of 4

It is certified that error appears in the above-identified patent and that said Letters Patent is hereby corrected as shown below:

Col. 8, Line 15;

"pull up" should be --pull-up--.

Col. 8, Line 21;

"pull up" should be --pull-up--.

Col. 8, Line 23;

"pull up" should be --pull-up--.

Col. 8, Line 28;

"pull up" should be --pull-up--.

Col. 8, Line 42;

After "1023 when" (second occurrence) delete --RF--.

Col. 9, Line 38;

Before "provide" insert --to--.

Col. 9, Line 57;

"pull up" should be --pull-up--.

Col. 10, Line 19;

"With" should be --with--.

UNITED STATES PATENT AND TRADEMARK OFFICE
CERTIFICATE OF CORRECTION

PATENT NO. : 5,614,885
DATED : March 25, 1997
INVENTOR(S) : Paul S. Van Lente et al.

Page 3 of 4

It is certified that error appears in the above-identified patent and that said Letters Patent is hereby corrected as shown below:

Col. 10, Line 44;

After "201" insert --.--.

Col. 11, Line 30;

After "closed" insert --,--.

Col. 11, Line 35;

"o" should be --to--.

Col. 11, Line 46;

"map lamp" should be --maplamp--.

Col. 11, Line 47;

After "if" insert --during--.

Col. 11, Line 66;

"Off" should be --off--.

Col. 14, Line 7;

After "the" delete --.--.

Col. 14, Line 47;

"64" should be --54--.

UNITED STATES PATENT AND TRADEMARK OFFICE
CERTIFICATE OF CORRECTION

PATENT NO. : 5,614,885
DATED : March 25, 1997
INVENTOR(S) : Paul S. Van Lente et al.

It is certified that error appears in the above-identified patent and that said Letters Patent is hereby corrected as shown below:

Col. 17, Line 9;

After "was" insert --the--.

Col. 20, Line 2;

"It" should be --If it--.

Col. 20, Line 53;

"apparent" should be --applied--.

Col. 22, Line 43;

"terminals" should be --terminal--.

Col. 23, Line 39;

Delete "garage door" (first occurrence).

Signed and Sealed this

First Day of December, 1998

Attest:

BRUCE LEHMAN

Attesting Officer

Commissioner of Patents and Trademarks

UNITED STATES PATENT AND TRADEMARK OFFICE
CERTIFICATE OF CORRECTION

| | | |
|---|---|---|
| PATENT NO. | : 5,614,885 | Page 1 of 1 |
| APPLICATION NO. | : 07/567390 | |
| DATED | : March 25, 1997 | |
| INVENTOR(S) | : Van Lente et al. | |

It is certified that error appears in the above-identified patent and that said Letters Patent is hereby corrected as shown below:

On the Title page item "[75] Inventors: Paul S. Van Lente; Mark L. Zeinstra; Michael J. Suman; William S. DeVree, all of Holland, Mich."

Should read: "[75] Inventors: Paul S. Van Lente; Mark L. Zeinstra; Michael J. Suman; William S. DeVree, all of Holland, Mich. and Fred Bassali, Great Neck, NY."

Signed and Sealed this
Seventeenth Day of March, 2015

Michelle K. Lee
*Director of the United States Patent and Trademark Office*